J. T. BEARD, Jr.
AUTOMATIC SOUND REPRODUCING MACHINE.
APPLICATION FILED JULY 12, 1917.

1,378,647.   Patented May 17, 1921.
9 SHEETS—SHEET 1.

James T. Beard, Jr. Inventor

By M. C. Syddaue
Attorney

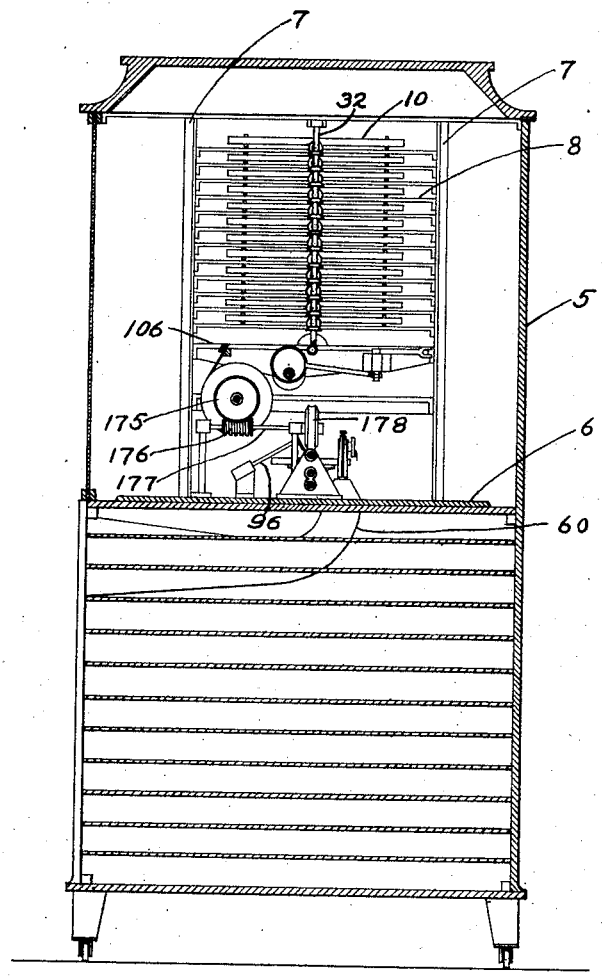

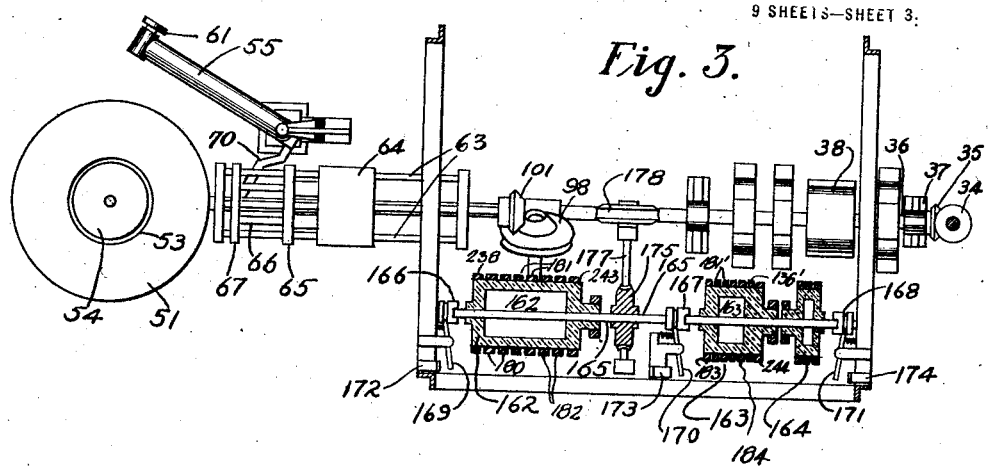
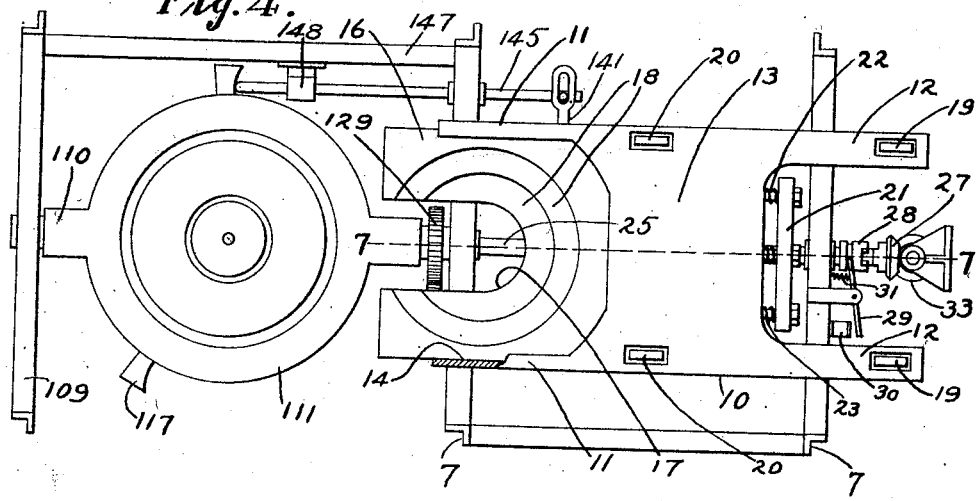

J. T. BEARD, Jr.
AUTOMATIC SOUND REPRODUCING MACHINE.
APPLICATION FILED JULY 12, 1917.

1,378,647.

Patented May 17, 1921.
9 SHEETS—SHEET 4.

James T. Beard, Jr. Inventor

By M. C. Lyddane
Attorney

J. T. BEARD, Jr.
AUTOMATIC SOUND REPRODUCING MACHINE.
APPLICATION FILED JULY 12, 1917.
1,378,647.
Patented May 17, 1921.
9 SHEETS—SHEET 5.
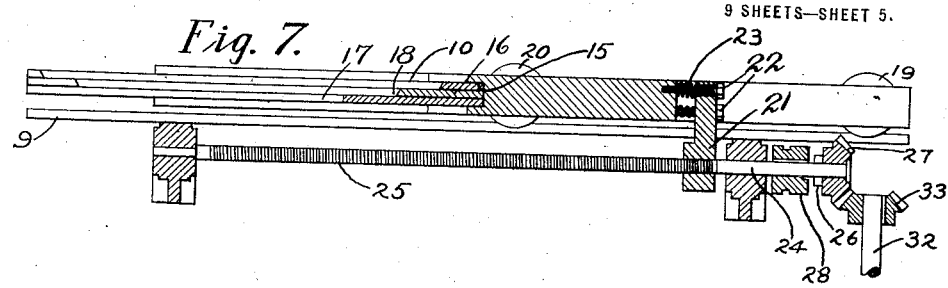
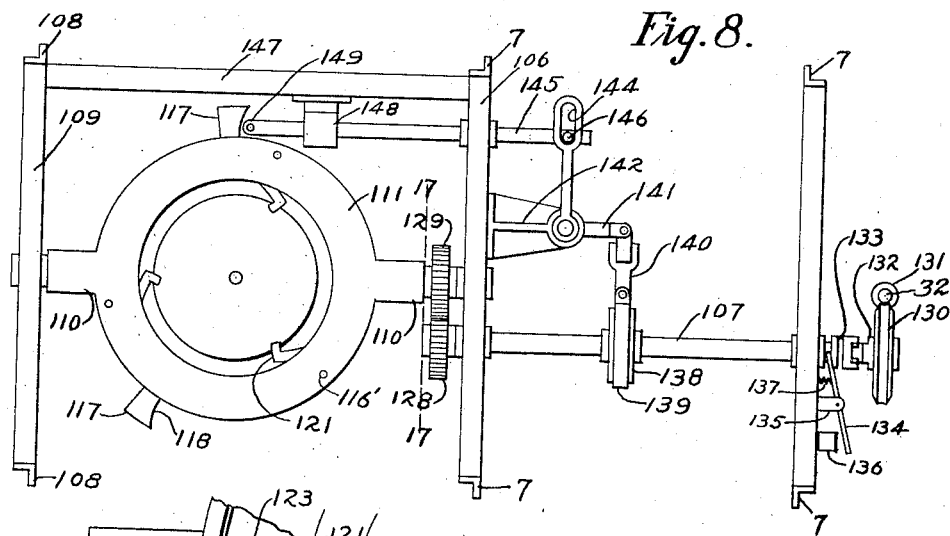
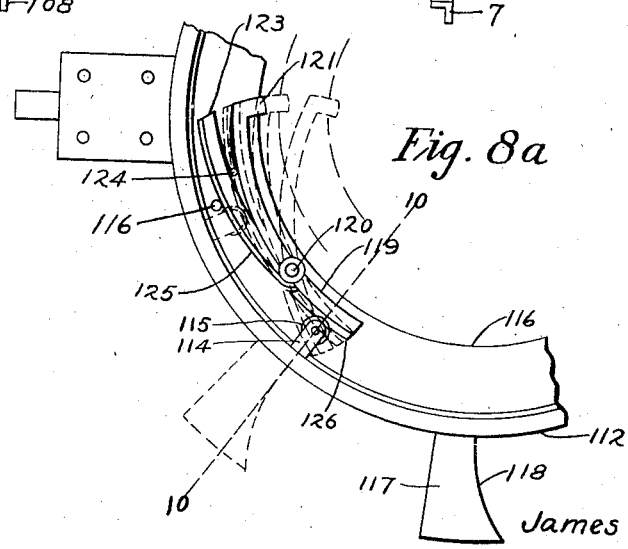
James T. Beard, Jr. Inventor
By M. C. Gyddall
Attorney

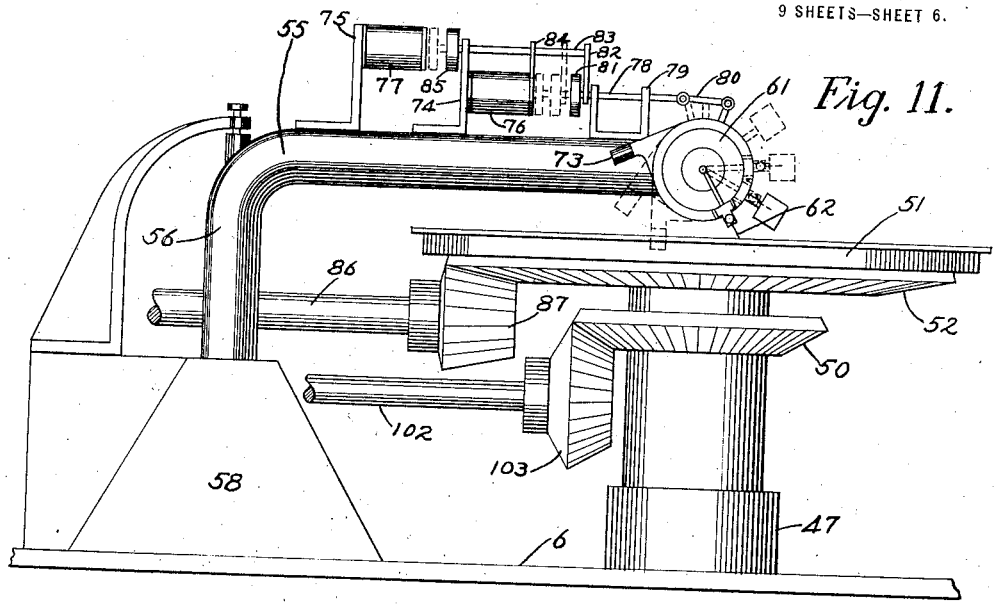

J. T. BEARD, Jr.
AUTOMATIC SOUND REPRODUCING MACHINE.
APPLICATION FILED JULY 12, 1917.

1,378,647.

Patented May 17, 1921.
9 SHEETS—SHEET 7.

James T. Beard, Jr. Inventor

By M. C. Syddall
Attorney

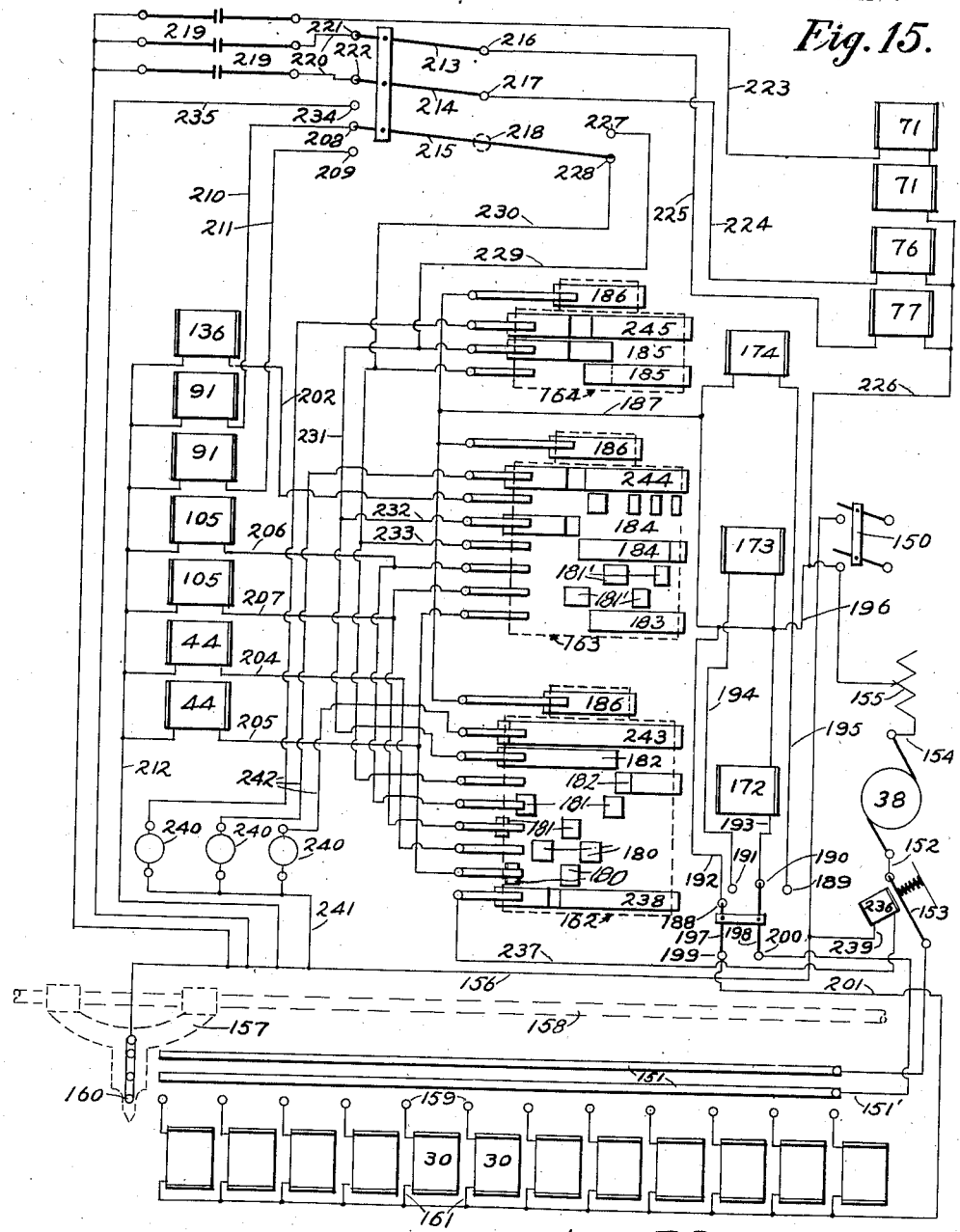

J. T. BEARD, Jr.
AUTOMATIC SOUND REPRODUCING MACHINE.
APPLICATION FILED JULY 12, 1917.
1,378,647.
Patented May 17, 1921.
9 SHEETS—SHEET 9.
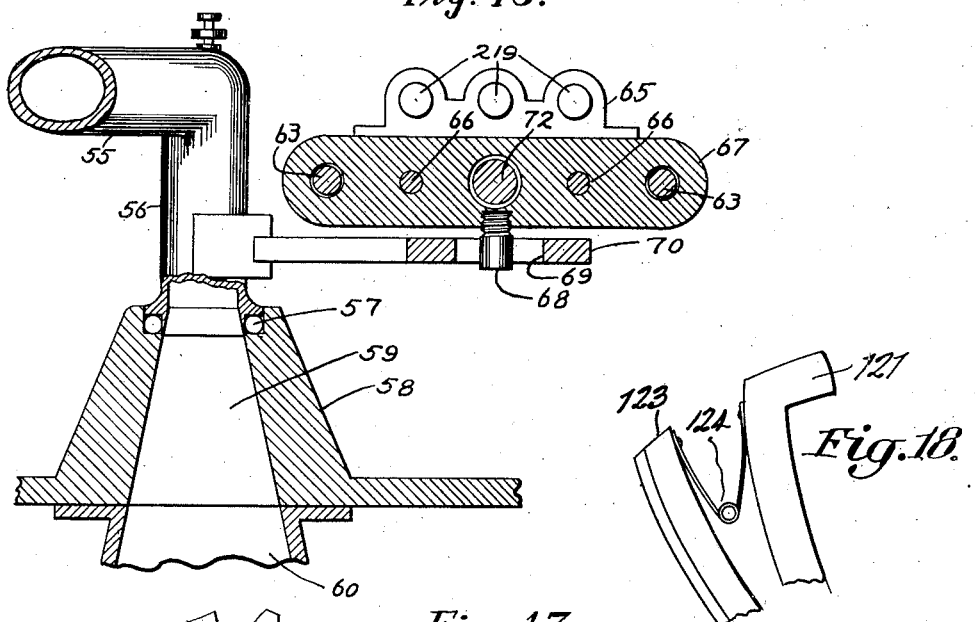
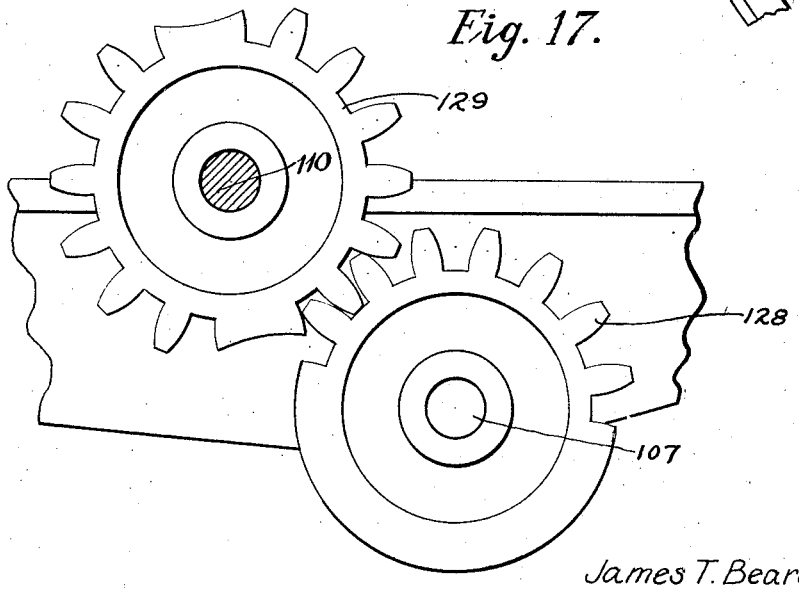
James T. Beard, Jr. Inventor
By M. C. Lyddane
Attorney

UNITED STATES PATENT OFFICE.

JAMES T. BEARD, JR., OF BROOKLYN, NEW YORK.

AUTOMATIC SOUND-REPRODUCING MACHINE.

1,378,647.  Specification of Letters Patent.  Patented May 17, 1921.

Application filed July 12, 1917. Serial No. 180,056.

*To all whom it may concern:*

Be it known that I, JAMES T. BEARD, Jr., a citizen of the United States, residing at Brooklyn, in the county of Kings and State of New York, have invented certain new and useful Improvements in Automatic Sound-Reproducing Machines, of which the following is a specification.

This invention relates to an automatic sound reproducing machine, and in its broadest aspect contemplates the provision of a machine of this type capable of selectively reproducing sound from any one of a series of disk records, and which is entirely automatic in its operation.

It is another object of the invention to provide a sound reproducing machine having a disk magazine and electro-mechanical means for selectively transferring any one of the disks to the playing table, and automatically returning the disk to the magazine when the playing of the record has been completed.

It is also a very important object of the invention to provide simple and positively operating mechanism for automatically reversing a disk having a record on each side thereof.

The invention further contemplates the provision of electrically-controlled means for manipulating the tone arm and properly positioning the needle or stylus upon the record at the start of the reproducing operation, and also elevating the needle from the disk surface at the end of such operation.

It is another one of the principal objects of the invention to provide simple electrically operable means for repeating the playing of a record disk or reversing the position of the disk to play the opposite side thereof, together with indicative means in the electrical circuit to indicate the particular operation of the machine.

And it is also one of the detail objects of the invention to provide an improved automatic clutch mounted in a rotatable frame and adapted to engage and hold the disk when said frame is rotated to reverse the position of the disk with respect to the playing table.

And it is a further general object of my invention to materially simplify the construction of sound reproducing machines, as above characterized, and to provide mechanism for positively performing automatically the several necessary operations, which is susceptible of very compact arrangement in a suitable case or cabinet, and can be produced at comparatively small manufacturing cost.

The operation of my machine in its preferred embodiment, wherein the several operations are performed automatically and in proper sequence, may be briefly stated as follows:

When the several parts of the mechanism are in their normal relative positions, the magazine, which consists of a series of rectilinearly movable superposed trays, is supplied with the record disks, said trays having provision to receive two different sizes of the disks. By closing an electric circuit, the disk-selecting mechanism is rendered operative to move one of the trays and position the disk carried thereby immediately above the playing table. At the end of this movement, disk transferring means is automatically operated to remove the disk from the tray, the movement of the latter being reversed, and to lower said disk into position upon the table. By the closing of the circuit, the table rotating mechanism is rendered operative, and through this mechanism a separate mechanism which is operatively connected to the tone arm is also operated, and the tone arm is swung inwardly toward the edge of the record. Electro-mechanical means now operates to oscillate the sound box swiveled on the end of the tone arm, and properly position the needle or stylus in the record groove. In the continued rotation of the table the sound is reproduced, and when the stylus reaches the inner end of the groove, it is automatically raised from the record, and the rotation of the table reversed, to swing the tone arm outwardly beyond the edge of the table. By means of electrically-controlled gearing the disk may now be raised from the table and positioned within a rotatable reversing frame, and held therein by automatically operable clutch devices. The frame is then rotated to reverse the disk, and the disk is again lowered into position on the table. The tone arm is then automatically manipulated, and the stylus again positioned in the record groove. At the end of the playing of each side of the disk record, the operation of the mechanism ceases, but by closing the proper circuits the playing of the record score may be repeated or the disk reversed. The several electrical circuits whereby the operation of the different mechanisms is controlled may be connected to any suitable source of current as, for instance, a house lighting circuit. After starting the operation of the machine, it requires no further attention as it will automatically stop itself, and consequently the possibility of injury to the mechanism due to inattention is obviated.

In the accompanying drawings, wherein I have illustrated what I at present believe the preferred embodiment of the invention and wherein like reference characters designate corresponding parts throughout the several views:—

Fig. 2 is a section taken on the line 2—2 of Fig. 1.

Fig. 3 is a section taken on the line 3—3 of Fig. 1.

Fig. 4 is a top plan view of the mechanism.

Fig. 7 is a section through one of the disk trays on the line 7—7 of Fig. 4.

Fig. 8 is an enlarged plan view of the reversing frame showing a disk held therein by the clutch devices.

Fig. 8ª is an enlarged fragmentary plan view of said frame showing one of the clutch elements in its normal position.

Fig. 9 is a detail elevation of the operating means for the rotatable reversing frame and the clutch actuating mechanism.

Fig. 10 is a detail section taken on the line 10—10 of Fig. 8ª.

Fig. 11 is a detail section illustrating the several positions of the needle or stylus with respect to the surface of the disk record.

Figure 1:
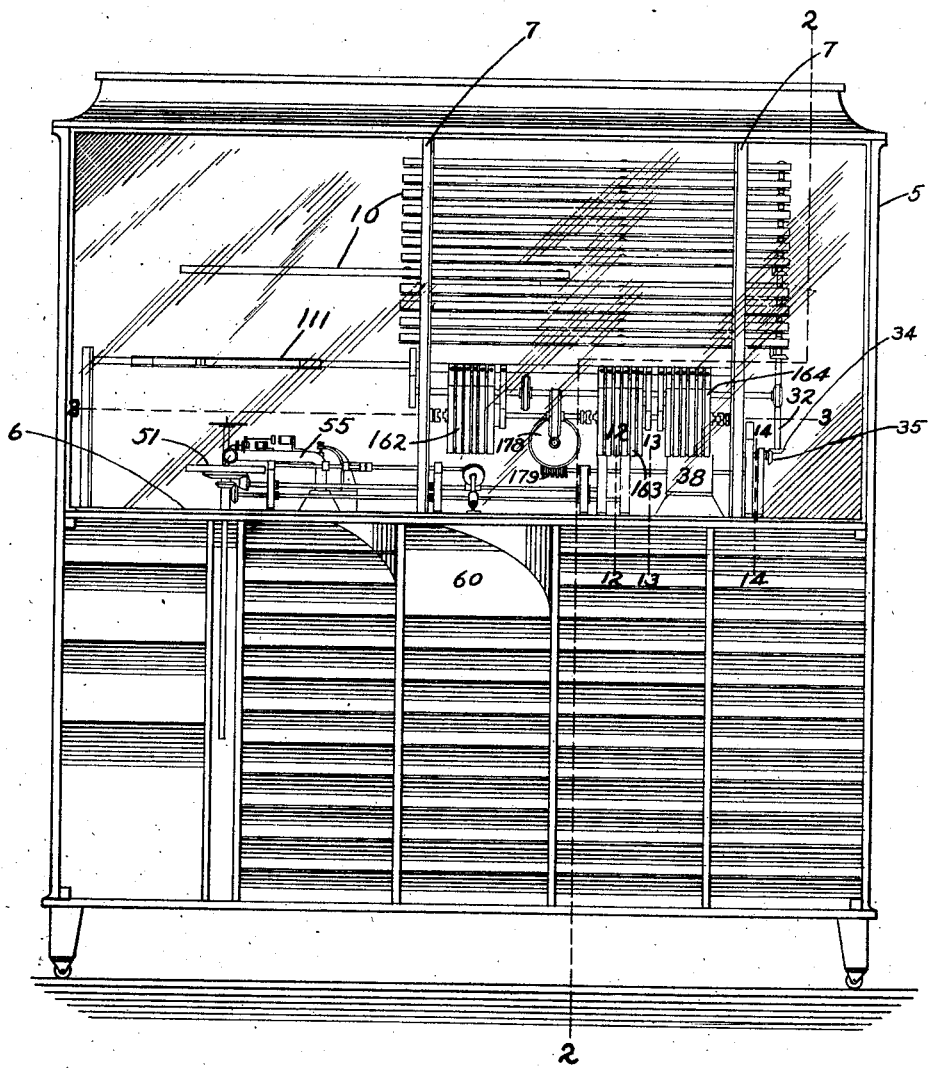
Figure 1 is a front elevation of the machine.
Figure 12:
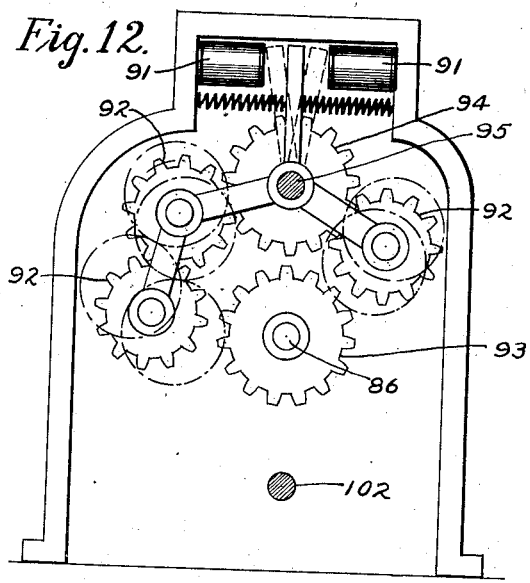

Fig. 12 is a detail section taken on the line 12—12 of Fig. 1 showing the reversing gears for the table rotating mechanism.

Figure 13:
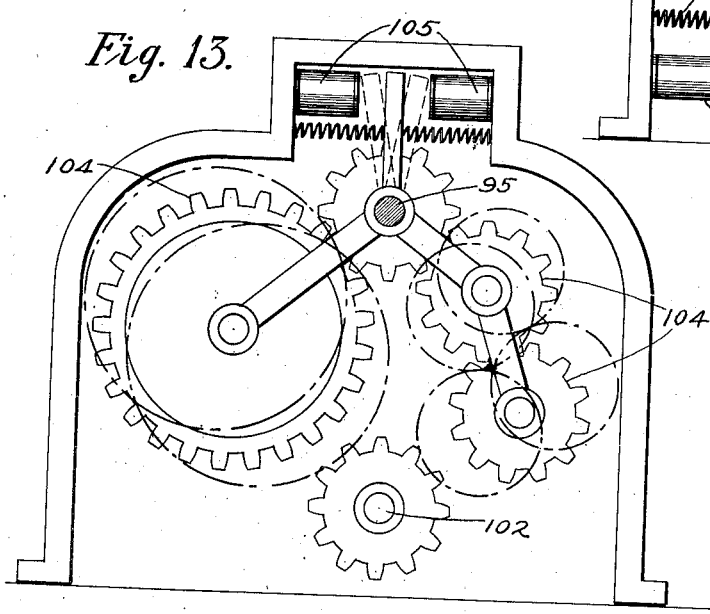

Fig. 13 is a section taken on the line 13—13 of Fig. 1 illustrating the reversing gears for the disk transferring shaft.

Figure 14:
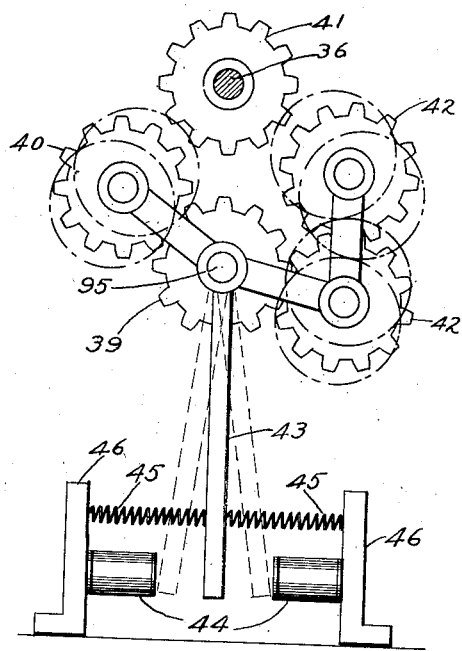

Fig. 14 is a section taken on the line 14—14 of Fig. 1 showing the reversing gears for the disk selecting mechanism.

Fig. 15 is a diagrammatic view showing the wiring for the several electrical circuits controlling the operation of the different mechanisms.

Figure 6:
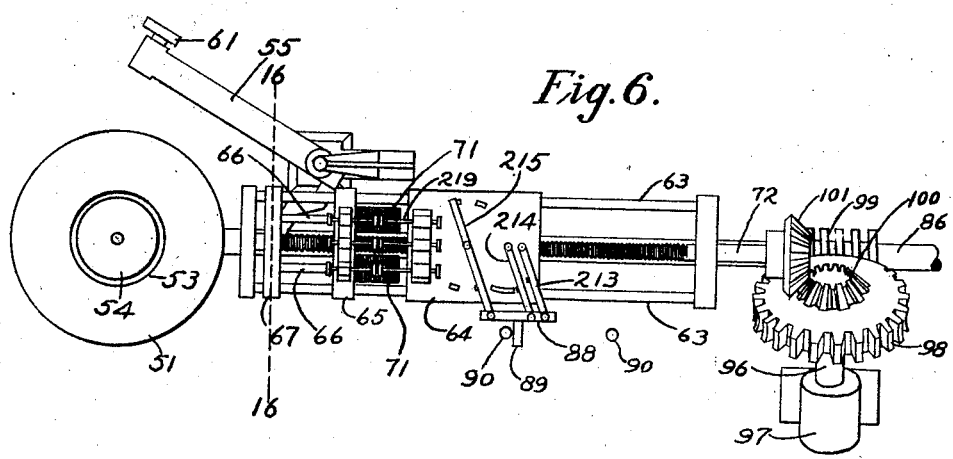
Fig. 6 is a top plan view of the playing table, the tone arm and the operating means for the latter.

Fig. 16 is a sectional view taken on the line 16—16 of Fig. 6.

Fig. 17 is a detail section taken on the line 17—17 of Fig. 8.

Fig. 18 is an enlarged detailed plan view illustrating the means for yieldingly urging the disk-engaging clutch dog to its effective position.

Referring in detail to the drawings, 5 designates a suitable casing or cabinet within which the disk rack or magazine, as well as the entire operating mechanism, is arranged. This case may be of any desired ornamental form, and may be constructed of wood or other materials. Within this case or cabinet there is supported in any convenient manner a bed plate 6, to which the lower ends of spaced uprights 7 are secured, the said uprights preferably being in the form of angle bars. These uprights are arranged in pairs, the uprights of each pair being connected by means of a plurality of spaced transverse bars 8. To the corresponding angle bars between each pair of uprights, rods 9 are suitably secured, said rods constituting supporting tracks for the several disk trays. Each tray, designated generally by the numeral 10, has spaced parallel arms 11 and 12, respectively, extending in relatively opposite directions from its medial portion 13. The arms 11 are provided in their inner sides with guide channels or grooves 14 and the edge of the medial portion 13 of the tray with a similar groove designated 15. These grooves receive the edges of a flat plate 16 which may be constructed of metal, fiber, wood, or any other desired material. The plate 16 is provided with a slot or opening 17 extending inwardly from one end edge of the plate to the center thereof. This plate is further provided with substantially circular seats 18 of different diameters and in concentric relation to each other, which are adapted to receive disk records of corresponding diameters. The tray 10 has rollers 19 mounted in the ends of the arms 12 and similar rollers 20 are also mounted in the medial portion 13 of the tray in line with the rollers 19. These rollers 19 and 20 are adapted to travel freely upon the supporting track rods 9.

A bar 21 is arranged between the inner ends of the arms 12 of the tray and loosely engaged upon the spaced bolts 22 which are fixed in the medial portion 13 of the tray. Coiled springs 23 are interposed between this bar and the opposed edge of the tray and serve to cushion the forward movement of the tray from its normal position.

In suitable bearings provided upon the bars 8 and centrally beneath each of the trays 10 a shaft 24 is rotatably mounted. This shaft has a threaded opening indicated at 25, which is engaged in a threaded opening provided in the bar 21. Upon one end of the shaft 24 a clutch member 26 is secured and has a bevel gear 27 fixed on one of its ends. With this clutch member a complementary clutch member 28 keyed upon the shaft 24 is adapted to engage. The clutch member 28 is actuated through the medium of a lever 29, one end of which is operatively engaged with the clutch member, the other end of the said lever being disposed in opposed relation to the core of a magnet coil 30. The spring 31 connected to said lever operates to move the clutch element 28 to an inactive position when the magnet coil is demagnetized.

A perpendicular shaft 32 is suitably mounted at one end of the series of trays 10, and has spaced bevel gears 33 fixed thereon which are in constant mesh with the respective gears 27. The shaft 32 is provided upon its lower end with a beveled pinion 34, which meshes with a similar pinion 35 fixed upon one end of a horizontal shaft 36 which is mounted in a suitable bearing indicated at 37. 38 designates an electric motor through the medium of which the tray-actuated mechanism and several other mechanisms to be hereinafter described are operated. The motor shaft has a gear 39 secured thereon which is adapted to transmit rotation to the shaft 36 in one direction through the medium of a gear 40 adapted to engage with the gear 39 and gear 41 fixed on the shaft 36. Rotation is transmitted to said shaft in an opposite direction through the medium of the reversing gears 42, one of which is adapted to operatively engage the gear 39 and the other the gear 41. The gears 40 and 42 are mounted upon the oscillating lever 43 which is disposed between spaced electro-magnets 44. The lever is normally held in a neutral position when the magnets are demagnetized by means of coiled springs 45 which are disposed between the opposite sides of said lever and a vertical frame bar 46.

Upon the bed plate 6 a standard 47 is formed or suitably secured through which a vertical shaft 48 is movable. This shaft is threaded as at 49 and upon the same the bevel gear 50 has threaded engagement. 51 designates the rotary disk table, to the underside of which a relatively large bevel gear 52 is secured. Suitable ball bearings are interposed between this gear and the gear 50, and also between the latter gear and the upper end of the guide standard 47. The table 51 is formed with a central circular recess 53 to accommodate the plate 54 which is fixed to the upper end of the vertical shaft 48. In the lowermost position of the shaft, the upper surface of this plate is disposed below the plane of the upper surface of the table 51. The tone arm indicated generally by the numeral 55 has a vertical end portion 56 Figs. 11 and 16 swiveled for rotary movement as at 57 upon a hollow extension or boss 58 formed upon the bed plate 6, said extension having a downwardly flaring bore 59 from which the sound issues into an amplifying horn 60 of any approved construction, which is suitably secured to the bed plate. The horizontal portion of the tone arm 55 is thus supported for free swinging movement above and in spaced relation to the disk supporting table 51. Upon the end of this horizontal tone arm, the sound box 61 is swiveled for swinging movement in a vertical plane, said sound box being equipped with the usual needle or stylus indicated at 62.

Upon fixed guide rods 63, Figs. 3, 6 and 16, a nut 64 is mounted for free longitudinal movement, and a head 65 is also mounted upon these guide rods in spaced relation to said nut. This head is connected by means of the spaced bars 66 to a second head 67 which is also supported by the guide rods 63 for longitudinal travel thereon. This latter head is provided with a pin or studs 68 which is engaged in a slot 69 formed in one end of an angular arm 70, the other end of which is fixed in any suitable manner to the vertical end portion 56 of the tone arm 55. Between the nut 64 and the head 65, a pair of electro-magnets 71 are arranged, said magnets being suitably fixed to the head 65 of the traveling carriage. 72 designates a horizontally disposed threaded shaft which is operatively engaged with the nut 64, and it will be understood that when the magnets 71 are energized, the carriage which includes the heads 65 and 67 and the connecting bars 66, is bound or connected by magnetic attraction to the nut 64 so that the said carriage moves with the nut. Through the medium of the pin and slot connection Fig. 16 of the carriage to the arm 70 fixed to the tone arm 55, the latter is swung inwardly to bring the needle or stylus to its playing position. The sound box carries a small roller 73 which is adapted to engage the edge of the record disk and limit the inward swinging movement of the tone arm. The movement of the carriage is thus stopped while the nut 64 continues its travel upon the guide rod 63. By this continued movement of the nut, the circuit for the electro-magnets 71 is broken, as will hereinafter more fully be explained in the detailed description of the electric circuit whereby the operation of the several mechanisms is automatically controlled.

Upon the tone arm 55 spaced brackets 74 and 75, respectively, are secured. Upon the bracket 74 an electro-magnet 76 is mounted, and a similar magnet 77 is also mounted upon the other bracket 75. A rod 78 is longitudinally movable in a suitable guide 79 fixed upon the tone arm, and a rod 80 is pivotally connected to one end of this rod 78 and to the sound box 61. The other end of the rod 78 is equipped with a head 81 and one end of an arm 82 is loosely engaged upon the rod behind this head. A second longitudinally shiftable rod 83 is fixed to the other end of this arm, said latter rod being mounted in the upper end of the bracket 74 and in a guide plate 84 on the end of the electromagnet 76. The rod 83 is also provided upon its other end with a head 85. This head is opposed to the core of the magnet 77, while the head 81 of the shiftable rod 78 is opposed to the core of the magnet 76. When the magnets 76 and 77 are both energized, the sound box 61 is swung to the limit of its movement, and the needle or stylus 62 is elevated to the greatest extent, in which position the roller 73 on the sound box will strike the edge of the record as above explained. When the magnets 71 are deënergized by the continued traveling movement of the nut 64, the magnets on the tone arm are also deënergized so that the sound box will swing downwardly and the needle will position itself in the first record groove.

The record table 51 is rotated through the medium of a shaft 86 upon one end of which a bevel pinion 87 is secured, said pinion meshing with the teeth of the bevel gear 52. In the rotation of the table, the tone arm 55 swings inwardly and the traveling carriage to which the arm 70 is connected, is, of course, moved upon the guide rods 63. The nut 64 continues its travel independently of the carriage through the rotation of the shaft 72. When the needle or stylus reaches the last groove of the record, the swinging movement of the tone arm and the travel of the carriage, of course, comes to a stop. Upon the nut 64 Fig. 6, a switch lever 88 is mounted, and is formed with a projecting arm 89 which engages a stationary part 90 fixed to the bed plate 6. This switch lever is in series with the needle control magnets 76 and 77 Fig. 11, and also with the magnet coils 91 which actuate the reversing gears 92 Fig. 12, whereby the rotation of the table is reversed. The arrangement of these gears with respect to the gear 93 fixed on the shaft 86 and the gear 94 on the motor shaft 95, is substantially identical with the arrangement of the reversing gears for the shaft 36 above described. As will be later explained, the operation of the switch lever operates to reverse the rotation of the disk table, and energizes the first of the magnets 77 to swing the sound box 66 upwardly for a sufficient distance so that the needle or stylus will be raised from the record surface. Simultaneously, the movement of the nut 64 is reversed, and the nut now pushes the traveling carriage along the guide rod 63, the electromagnets 71 being again energized so that the carriage and nut are held together. The needle and the roller 73 on the sound box are thus both sustained in this latter position so that neither will contact with the record surface during the outward swinging movement of the tone arm. After the sound box has been swung beyond the edge of the rotary disk table, the operating gears 92 are thrown to the neutral position.

The carriage operating screw or shaft 72 is connected to the table rotating shaft 86 for synchronous operation through the medium of an inclined shaft, 96, mounted in a suitable supporting bearing 97 Fig. 6, upon which a worm gear 98 is fixed to mesh with the worm 99 secured on the shaft 86. A bevel pinion 100 is also fixed to one end of the shaft 96, and meshes with a similar pinion 101 on the shaft 72. It will thus be apparent that in the rotation of the table in a direction to play the record, the nut 64 will be moved in one direction and when the rotation of this table is reversed, said nut will be moved in a relatively opposite direction.

Figure 5:
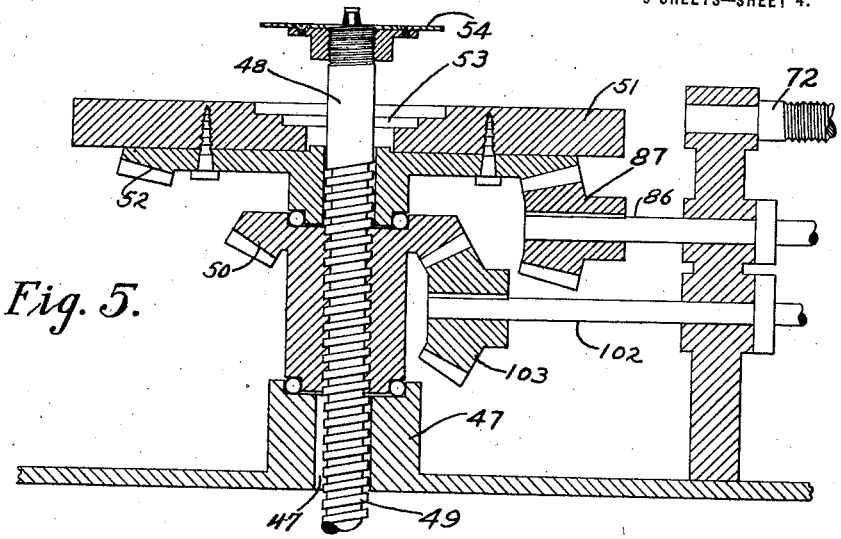
Fig. 5 is an enlarged vertical section through the playing table showing the operating means for said table and for the vertically movable disk transferring rod or shaft.

The record is placed in position upon the table 51 by means of the threaded shaft 48. This shaft is actuated through the medium of a horizontal shaft 102, Fig. 5, which is equipped with a beveled pinion 103, said pinion meshing with the bevel gear 50 which is threaded on said shaft. Reversing gears 104 are also provided for the shaft 102, said gears being also automatically actuated by electromagnets 105 in a similar manner to the other reversing gear sets. In the rotation of the shaft 102 in one direction, the shaft 48 is moved upwardly so that the plate 54 will move through the slot 17 in the disk supporting plate 16 and engage against the underside of the disk. The upward movement of the shaft continues so that the disk will be elevated above the plane of the tray 10. The operation of the several mechanisms is properly timed so that the movement of the tray 10 is now reversed, and the tray is returned to its normal position in the magazine between the uprights 7. During this movement of the tray, the reversing gears 104 for the disk supporting rod or shaft 48 are thrown into neutral position. These gears are then reversed so that the rod or shaft 48 is moved downwardly and the disk is lowered into position upon the playing table. The shaft 48 is keyed in the standard 47 on the bed plate as shown at 47' (See Fig. 5) so as to prevent rotation thereof. As above stated, the downward movement of the rod 48 will continue until the plate 54 on the upper end of said rod is wholly disposed within the recess 53 in the table and is out of contact with the underside of the disk. The table operating mechanism is now actuated, and the several operations above described then automatically take place, and the record is played. After the playing of the record, the gears 104 are automatically thrown in to rotate the gear 50 in the proper direction to raise the rod or shaft 48, thereby elevating the record to a position above the upper disk tray of the magazine. At this time, the gearing for the vertical shaft 32 operates to move the proper tray forwardly beneath the record disk. The shaft 48 then again descends, leaving the record in place upon the tray, the latter returning to its place in the magazine, and the gears 104 being thrown to neutral when the shaft 48 reaches its lowermost position with the disk 54 disposed within the recess 53 of the table 51. If desired, the playing of the record may be repeated, or the record which has been played may be reversed, the machine being especially designed for the playing of double disk records. This reversing mechanism, which is also entirely automatic in its operation, I will now proceed to describe in detail.

The uprights 7 in each pair below the disk magazine are connected by means of the transverse bars 106, upon which a horizontal shaft 107 is mounted in suitable bearings. A pair of relatively short uprights 108 are mounted upon the bed plate 6 on the relatively opposite side of the rotary disk table 51 with respect to the uprights 7, and are likewise connected adjacent their upper ends by bar 109, Fig. 10. In bearings on this bar and the bar 106 connecting the adjacent uprights 7, are the reduced ends of gudgeons 110, said gudgeons projecting radially from diametrically opposite sides of a circular frame 111. In this frame a circumferentially movable annulus 112 is mounted between suitable ball bearings shown at 113 Fig. 10. This annulus is provided at equi-distantly spaced points with inwardly-projecting radially-disposed arms 114 on which rollers 115 are mounted. The frame 111 includes annular side plates 116 between which the movable annulus 112 is housed. The side plates 116 are held in properly spaced relation by the pins 116' arranged at spaced intervals and threaded at their ends in said plates. Radial lugs 117 fixed to the ring or annulus 112 project outwardly between said plates, and are provided with concave faces 118 for a purpose which will presently appear.

Between the spaced side plates 116 of the frame, the clutch levers 119 are pivotally mounted in spaced relation to one of their ends as at 120, the other end of each lever having an angularly disposed terminal 121, said terminal being formed with a kerf 122 which is adapted to receive the edge of a record disk. A second lever 123 Fig. 8ª is also loosely mounted at one of its ends upon the pivot pin or stud 120 of each clutch lever and between the other end of the lever 123 and the opposed end of the clutch lever a suitable spring 124 is arranged and normally acts to urge said levers in relatively opposite directions. The lever 123 is provided upon its outer face with a longitudinally extending rib 125, and the relatively short end portion of the clutch lever 119 projecting from one side of the pivot 120 has a correspondingly located rib 126 formed thereon. These ribs are adapted for engagement in the peripheral groove 127 formed in the roller 115 whereby relative displacement of the levers and the roller is effectually prevented.

The shaft 107 is provided upon one of its ends with an interrupted gear 128, the teeth of which are adapted to mesh with an interrupted gear 129 fixed upon one of the gudgeons 110, Fig. 17. Upon the other end of the shaft 107 a worm gear 130 is loosely mounted and is engaged by a worm 131 fixed upon the vertical shaft 32 which constitutes a part of the disk selecting mechanism. The gear 130, Fig. 8, is equipped with a clutch element 132 with which the shiftable clutch member 133 keyed upon the shaft 107 is adapted to co-act. This clutch element is actuated through the medium of an armature lever 134 fulcrumed intermediate of its ends upon the bar 106 as at 135. One end of this lever is opposed to the core of an electro-magnet 136, and a coiled spring 137 connected to said lever normally holds the clutch member 133 in an inactive position on the shaft 107.

An eccentric 138 is fixed upon the shaft 107, and the eccentric strap 139 is connected by means of a link 140 to one arm of a bell crank lever 141 fulcrumed upon a bracket 142 suitably secured to one of the frame bars 106. The longer arm of the bell crank lever 141 is slotted as at 144, and in this slot a pin 146 fixed to one end of a rod 145 is loosely engaged. This rod is axially shiftable through one or more supporting and guide brackets 148 fixed upon the bar 147 which connects the front upright 108 to one of the front uprights 7. Upon the other end of the rod 145 a roller 149 is mounted, and this roller is adapted to co-act with the concave face 118 of one of the lugs 117 in the axial movement of the rod 145 in one direction whereby it will be manifest that the annulus is shifted circumferentially in a corresponding direction with respect to the frame 111.

When the rollers 115 are in their normal positions, they are engaged with the ribs 126 on the ends of the clutch levers 119, and as they move upon the said ends of the levers in the shifting movement of the ring or annulus in one direction, it will be apparent that the other ends of these levers are thrown outwardly, and when in such position, either a 10 or a 12-inch record may be positioned between the terminals 121 of said levers.

When it is desired to reverse the record after on side thereof has been played, electrically controlled means are operated to cause an upward movement of the rod 48 to lift the disk from the table 51 and move the same within the reversing frame and between the spaced clutch levers. The gearing for the shaft 32 is also thrown into operation, and, at the proper time, or in other words, at the end of this elevation of the disk, the clutch 133 is thrown in to lock the worm gear 130 to the shaft 107. It will now be apparent that through the medium of the eccentric 138 and the operating connections between this eccentric and the rod 145, said rod is axially shifted in the proper direction to move the ring or annulus 112 circumferentially, and thereby move the rollers 115 carried by said annulus to the opposite sides of the respective lever pivots 120 and upon the ribs 125 of the levers 123. It will be observed that in the released position of the clutch levers 119, the levers 123 project outwardly from the pivots 120 and are eccentrically related to the annulus 112. Thus when the annulus is shifted, as stated, these levers are forced inwardly and as they are connected by the springs 124 to the clutch levers 119, the latter move in unison with the levers 123 until the terminals 121 of the clutch levers are engaged with the edge of the record disk. This engagement occurs before the annulus has been shifted to the limit of its movement, and there will then occur a relative inward movement of the outer lever 123, thereby placing the interposed spring 124 under tension. This action of the parts takes place when either a large or small record is used, but in using the former record it will be understood that there is simply a greater relative movement of the lever 123 and a correspondingly greater degree of tension is placed upon the spring 124 than when the smaller sized record is used. After the record has been thus gripped and securely held within the frame 111, the interrupted teeth of the gear 128 come into mesh with the teeth of the gear 129 and rotate the frame 111 through 180 degrees, so that the face of the disk which was formerly uppermost is now downwardly disposed, and the position of the disk is completely reversed. It is, of course, understood that prior to the turning movement of the frame and the reversal of the disk, the operating mechanism for the shaft 48 has been reversed automatically, and the metal disk or plate 54 on the upper end of said shaft is lowered to its normal position. After the record disk has been reversed, the disk 54 is again raised and the operating gearing for the shaft 32 is now again operated to actuate the shiftable rod 145 and engage the roller 149 with the face 118 of the lug 117 thereby reversing the circumferential shifting movement of the ring or annulus 112 so that the rollers 115 carried thereby are moved upon the ribs 126 on the ends of the respective clutch levers 119 thereby disengaging the terminals 121 from the edge of the record disk and releasing the latter. The record disk is received upon the disk 54 which now automatically descends and again places the record in playing position upon the table 51. The tone arm is now operated in the manner above described to position the needle upon the record surface so that in the rotation of the table 51, the record score will be played.

In Fig. 15 of the drawings, I have illustrated diagrammatically the electric circuits for the operation of the several mechanisms. The current may be obtained from the house wiring system or separate storage batteries, and is controlled through the medium of a master switch indicated at 150. Upon the wall of the case or cabinet at a suitable point, or in a separate case, as may be preferred, spaced parallel metal conductors 151 are secured and suitably insulated from each other. One side of the field of the motor 38 is connected by a wire 152 to one of these metal conductors, a switch 153 of any suitable type being interposed in said wire. The other side of the motor field is connected by a wire 154 to one terminal of the switch 150, and in the wire 154 a speed control rheostat 155 is located. The opposite switch terminal is connected by a wire 156 to a manually operated slide 157 Fig. 15 suitably mounted upon a fixed rod or rail 158. This slide has means for metallic contact with the spaced parallel conductors 151. In spaced relation to these conductors, a series of metal contacts 159 are arranged, with which a contact 160 on the slide 157 is adapted to engage. The contacts 159 correspond in number to the number of record disk holding trays in the magazine, and these spaced contacts are connected respectively by means of wires 161 to the electromagnet coils 30 which operate the clutches whereby the shifting mechanism for the individual trays is rendered operative. It will thus be apparent that by adjusting the slide 157 to engage its contact 160 with the contact 159 corresponding to the selected record, the tray 10 carrying this record will be moved as above explained to dispose the record disk in co-axial relation above the playing table 51.

162 designates the master control drum, 163 the disk reversing drum, and 164 the repeating drum. These drums are loosely mounted upon a common shaft 165 Fig. 3, each of said drums carrying one section of a clutch. Clutch sections 166, 167 and 168, are keyed upon the shaft 165 for engagement with the clutch sections of the respective drums, whereby said drums may be independently locked to the shaft 165 for rotation therewith. Spring-held levers 169, 170 and 171 normally hold the respective shiftable clutch members in their inactive positions. Each of these levers is pivotally supported intermediate of its ends and has one end disposed in opposed relation to the core of the magnet. The electro-magnets for the operation of the respective clutches are designated 172, 173 and 174 Figs. 3 and 15, respectively. Upon the shaft 165 a worm gear 175 Figs. 2 and 3 is fixed and meshes with the worm 176 on the transversely disposed shaft 177. To one end of this shaft a worm gear 178 is fixed which in turn meshes with a worm 179 on the motor shaft 95. Through this worm gearing, the speed of rotation of the drum shaft is reduced to the proper ratio with respect to the motor shaft.

Each of the drums 162 and 163 is provided with split metallic conductors. The conductors 180 on the master drum 162 control the operation of the record tray shifting mechanism; the conductors 181 control the mechanism for raising and lowering the record disk, and the conductors 182 control the table rotating mechanism. The reversing drum 163 is likewise provided with two conductors 181' which control the disk raising and lowering mechanism, conductors 183 for the control of the tray shifting mechanism and the conductors 184 for the operation of the table rotating mechanism. The repeating drum 164 is provided with one pair of conductors 185 for the operation of the table rotating mechanism independently of the tray operating and disk elevating mechanisms. Each of these drums is equipped with a current supply ring or annulus indicated at 186 which is connected to the several insulated conductors of the drum, said rings being connected through the wire indicated at 187 to one side of the switch 150.

In Fig. 15 188, 189, 190 and 191 designate a series of contacts disposed in spaced relation, the contact 188 being connected by a wire 192 to one side of the switch 150. The contact 190 is connected by a wire 193 to one side of the magnet 172. The contact 191 is connected by a wire 194 to one side of the magnet coil 173 and the contact 189 is connected with a wire 195 to one side of the magnet coil 174. Wires 196 connect the other field windings of the magnet coils to the switch 150.

197 and 198 designate a pair of switch levers which are pivotally mounted on the posts or terminals 199 and 200 respectively for swinging movement. In one position of the switch levers, as illustrated in the drawing, the lever 198 is engaged with the contact 190, so that the circuit for the main operating drum coil 172 is closed. The switch post 199 is connected by a wire 201 with the series of tray coils 30. The coil 136, which controls the operation of the record reversing frame, is connected by a wire 202 with the metal conductor 136' on the reversing drum. One of the magnets 44, which shifts the reversing gear for the operation of the vertical shaft 32 in one direction, is connected by a wire 204 with one of the conductors 180 on the main drum. The other magnet 44 is connected by a wire 205 to the other of the conductors 180 and also with one of the conductors 183. One of the magnets 105 for the operation of the vertical shaft 48 in one direction is connected by a wire 206 to one of the conductors 181 and also with one of the conductors 181'. The other magnet 105 is connected by the wire 207 to the other conductor 181 and with the other conductor 181'. Spaced contacts 208 and 209 are connected by wires 210 and 211 to the respective magnets 91 for the table operating gearing. These magnets, as well as the magnets 105, 44, and 136, are connected by a wire 212 with the switch 150. Three switch levers 213, 214, and 215, Figs. 6 and 15 respectively, are connected for operation as a unit, the levers 213 and 214 being pivotally mounted at one of their ends upon the posts 216 and 217, respectively, while the other of said switch levers is pivotally mounted intermediate its ends as at 218. This multiple switch is the switch hereinbefore referred to as being mounted upon the traveling nut 64 which closes the circuit to energize the magnet 61 thereby holding the carriage in connection with said nut so that the carriage is moved in one direction. 219, Fig. 6, designates a series of contact members on the carriage and the traveling nut 64, said contacts being connected in series. Two of the contacts 219 on the nut 64 are connected by the wires 220 with spaced contacts 221 and 222 with which the respective switch levers 213 and 214 are adapted to engage. The other contact 219 on the nut is connected by a wire 223 with one of the carriage coils 71, which coils are connected in series with each other. The needle elevating coils 76 and 77, respectively, are connected by wires 224 and 225 to the switch lever posts 217 and 216, respectively. A wire 226 connects the coils 71, 76 and 77 with the switch 150.

One end of the switch lever 215 is adapted for engagement with the spaced contacts 208 and 209 in different positions of said lever, and the other end of said lever is adapted for engagement with spaced contacts 227 and 228. The contact 227 is connected by means of the wire 229 with one of the conductors 185 on the auxiliary repeating drum, while the other contact 228 is connected by a wire 230 with one of the conductors 182 on the main operating drum. The other of these conductors 182 is also connected through the wire 231 with the contact 227, said wire being suitably joined to the circuit wire 229. It is, of course, understood that the wires referred to are in electrical connection with the several split conducting rings on the rotary drums through the medium of suitable brushes which are engaged with the respective conducting rings.

The conductors 184, through the medium of which the table operating mechanism is controlled, are connected by wires 232 and 233, respectively, to the contacts 227 and 228.

The switch lever 214 in one position is adapted for engagement with the contact 234 which is connected by a wire 235 with the wire 156, in which position of said switch lever the first needle coil 76 will be energized independently of the other needle coil as will be later explained.

The starting switch 153 is of that type whereby the motor circuit is automatically broken when there is no load, and includes a switch lever normally moved to its open position by a suitable spring. An electromagnet 236 Fig. 15 holds said lever in its closed position. One side of the magnet coil is connected by a wire 237 to an additional split conducting ring 238 on the main operating drum. The other side of the magnet coil is connected by the wire 239 with the wire 156. Thus, when the operation of the several mechanisms has been completed and at the end of the playing of each record score, when the table control conducting rings 182 are disengaged from the brushes, the circuit will also be broken through the coil 236, thereby releasing the switch lever from the magnetic attraction of said coil so that it is returned to its open position by the spring whereupon the operation of the motor 38 will cease.

I have also provided means whereby the operator will be notified by a visual signal when the playing of the record has been completed. To this end, three electric lamps 240 are suitably mounted upon the wall of the case or cabinet, and are connected in series by means of a wire 241 to the wire 156. The respective lamps are also connected by means of wires 242 to additional split conducting rings 243, 244 and 245 on the main operating drum, the reversing drum and the repeating drum, respectively. While the machine is in operation for the first playing of the record, one of the lamps 240 is illuminated, and when the playing has been completed this lamp is extinguished by the breaking of the circuit. If the same record score is to be repeated, another of the lamps will remain illuminated during the repetition, and if the switch is moved to reverse the position of the record on the table and play the opposite side thereof, the third lamp will indicate this operation, and upon completion of the playing of the record it will likewise be extinguished. Thus there is a visual indication as to which operation is taking place. The bulge of the lamps will preferably be differently colored.

In the operation of the machine, the slide 157 is moved along the rod 158 to engage the slide contact 160 with one of the stationary contacts 159 according to the selected record disk in the magazine. It is, of course, understood that the main switch 150 has been closed. A circuit will therefore be closed from one side of the switch through the wire 156, slide contact 160, contact 159, and wire 161 to the electro-magnet 30 of the particular disk tray, and from the magnet through wire 201, contact 199, switch element 197 and wire 192 to the opposite pole of the switch 150. By the energization of this magnet, the gear 27 is locked by the clutch member 28 upon the actuating shaft 25 of the disk tray. The switch 153 is now closed to close the motor circuit through one of the conductors 151 with which a suitable contact on the slide 157 is engaged, the wire 156, the switch 150, the speed-control rheostat 155, and wire 154 to one side of the motor field, the wire 152 connected to the other side of the motor field completing the circuit. At the same time, one of the electro-magnets 44, which controls the gearing transmitting rotation from the motor shaft 95 to the vertical shaft 32, is energized, the circuit therefore being closed through the wire 212 to one side of the magnet field, wire 156 and switch 150 to the source of current, from wire 156 through slide 157, one of the conductors 151, wire 151' connecting said conductor to contact 200, then through switch lever 198, contact 190, wire 193 to the electro-magnet 172 on the main control drum, then from this magnet through wire 196 back to the source of current. The other side of the field of the magnet 44 is connected through wire 204 to one of the conductors 180, which conductor is connected through the ring or annulus 186 and wire 187 to the switch 150. By the energization of this coil 44, the vertical shaft gearing is operated to rotate the shaft 32 in the proper direction to transmit rotation to the shaft 25 whereby the disk carrying tray 10 will be moved from the magazine in a horizontal plane to a position at one side of the magazine and immediately above the rotatable disk-receiving table 51. This movement is limited by the deënergization of the magnet 44 when the brush moves into the split portion of the conductor 180. At this time, one of the conductors 181 contacts with its brush, and closes the circuit through wire 206, one of the electro-magnets 105 controlling the gearing 104 for the elevating shaft 48, whereby said magnet is energized to hold the gearing in the proper position so that rotation will be transmitted to the shaft 102 in the desired direction, which in turn, through the medium of the gear 87, rotates gear 50. This latter gear being threaded upon the shaft 48, said shaft is caused to move upwardly thereby elevating the metal disk 54 carried by said shaft. This upward movement continues until the disk 54 engages the record disk on the tray 10 and lifts the same above the plane of said tray. At this time the circuit for the magnet 105 is broken through the conductor 181 and the circuit is closed through the other of the conductors 181 for the opposed magnet 105 thereby reversing the position of the gearing 104, and in turn reversing the rotation of the shaft 48, so that said shaft and the record disk supported on the upper end thereof are lowered in the manner hereinbefore explained. The downward movement of this shaft continues until the record disk comes to a position of rest upon the upper surface of the table 51 and the metal disk 54 is disposed within the cavity 53 in said table. At this time the circuit through the last named magnet 105 is broken by the conductor 181 moving off the brush. When the switch 150 is closed, a circuit is also closed through wire 156, the contacts 219 on the tone arm carriage and the nut 64 through wire 223, coils 71, 76 and 77, wires 224 and 225, switch levers 213, 214, and wires 220, and through the wire 226 back to the source of supply. Thus the magnets 71, 76 and 77 are energized, and the tone arm carriage is magnetically bound to the nut 64. Both magnets 76, 77, being energized, the sound box is oscillated upon the tone arm, and the needle elevated to its highest position.

After the record disk has been positioned upon the table as above explained, a circuit is closed through one of the conductors 182, wire 230, switch lever 215, wire 210, one of the magents 91, wire 212, to the source of current and thence through wire 187 back to the conductor ring. Upon the energization of the magnet 91, the table gearing 92 is moved to transmit rotation in the proper direction from motor shaft 95 to the shaft 86. The gear 87 on this shaft meshing with gear 52 rotates the table. Rotation is also transmitted through the gearing 99 and 101 to shaft 72 to cause the travel of the carriage mounted on the rod 63. Through the medium of the arm 70, the tone arm is thus swung inwardly until the roller 73 engages the edge of the record disk. In the continued rotation of shaft 72, the nut 64 is pulled away from the carriage separating the contacts 219, and breaking the circuit through the coils 71, 76 and 77. The nut continues its travel independently of the carriage, while the sound box returns to its normal position, and the needle or stylus is engaged in the groove of the record. In the rotation of the table 51, the record is played in the usual manner, the sound box gradually moving inwardly toward the center of the record. At the end of the independent travel of the nut 64 just referred to, a part of the multiple pole switch mounted on said nut strikes the stationary part on the machine casing and moves said switch on the pivot 218. The contact 208 on one end of the switch lever 215 is thereby connected with the contact 209 and the contact 228 on the other end of this lever is connected with the contact 227. The contact 222 on the switch lever 214 is moved to engage with the contact 234 while the contact 221, on switch lever 213 is moved to break the connection with the circuit wire 220. The contact 222 on the lever 214 engages the contact 234 before the contact 208 on the lever 215 engages the contact 209. Thus a circuit will first be closed through the first needle coil 76 from the source of current, through wire 235, switch lever 214, wire 224, and wire 226, back to the source of current. By closing the circuit through this magnet, the needle or stylus is raised from the surface of the record disk to its intermediate position. Immediately after this operation, the contact 208 engages the contact 209, and the circuit of the table gear coil 91 previously energized, is broken, while a circuit is closed from the source of current through wire 187, the other of the conductors 182, wire 230, switch lever 215, wire 211, magnet coil 91, and wire 212 back to the source of current. When this latter magnet is energized, the position of the gearing 92 is reversed so that reverse rotation is transmitted to the table 51, whereupon the movement of the tone arm carriage is reversed, and the tone arm swung outwardly to dispose the needle or stylus beyond the edge of the record disk. Of course, when the rotation of the table is reversed, the movement of the nut 64 is likewise reversed, and when the contacts carried by the nut finally come into engagement with the contacts on the carriage, the circuit is again closed through the carriage coil 71 and also through the second needle coil 77, the switch levers 213, 214 and 215 having been returned to their normal position by engagement with a second fixed arm or projection indicated at 90. At this time, the metal conductor 182 will move out of engagement with its brush and the operation of the mechanism will stop.

If it is desired to repeat the playing of the record the switch levers 197 and 198 are moved in one direction to engage the lever 198 with the contact 189, and break the connection of lever 197 with contact 190, whereby a circuit will be closed through the magnet coil 174 for the repeating drum, this circuit being from the source of current through wire 156, slide 157, one of the conductors 151, wire 151', the switch lever 198, wire 195 through the magnet field and thence through wire 196 back to the source of current. Upon thus throwing in the clutch 168 of the repeating drum, said drum is rotated. A circuit will therefor be closed through one of the conductors 185, the wire 229, and wire 187 to the source of current, and through the wire 229, switch lever 215, wire 211, table gear coil 91, and wire 212 back to the source of current. The rotation of the disk table is reversed through the other of the conductors 185, the multiple pole carriage switch being thrown, and the several operations taking place as above described, the brush of this conductor being connected with the circuit wire 230.

If it is desired to reverse the record to play the opposite side thereof, then the switch levers 197 and 198 are moved to engage the switch lever 198 with the contact 191. A circuit will now be closed through the wire 156, the slide 157, conductor 151, wire 151', switch lever 198, wire 194, the clutch shifting magnet 173 and wire 196 back to the source of current. A circuit is thereby also closed in the rotation of the first auxiliary drum through wire 212, one of the coils 105, wire 206, to one of the conductors 181', and through wire 187 back to the source of current. The disk elevating shaft 48 will thus be rendered operative to raise the disk from the table. In this instance, the elevation of the disk is limited by the extent of the conductor 181' so that the upward movement of the shaft will stop when the disk is positioned within the reversing frame 111 and between the several clutch levers 119. When the above circuit is closed, it will be understood that the shaft 102 is rotated so that rotation is imparted to the gear 50 through the medium of the gear 103 fixed on said shaft, in a direction to move the shaft 48 upwardly. The plate 54 fixed on this shaft and normally disposed concentrically in the plane of the record disk table, is thereby elevated, lifting the disk from the table in the upward movement of the shaft 48 to position said disk within the reversing frame. It will, of course, be understood from the foregoing description that when the circuit is closed for the operation of the control drum 163 of the reversing mechanism, the other drums 162 and 164 remain stationary, the shiftable clutch elements of the latter drums being disposed in their inoperative positions. A circuit is also closed through the wire 212, the reversing magnet coil 44 for the vertical shaft 131, wire 205, and the conductor 183, and thence through wire 187 back to the source of current. The electromagnet 136 is also energized by closing a circuit through the conductor 136' on the drum and wire 202 whereby the clutch 133 is thrown to its operative position and the shaft 107 thus rotated. In the initial rotative movement of the shaft 107, the untoothed portion of gear 128 is opposed to the gear 129 so that the reversing frame is not rotated. In this initial operation of said shaft, the eccentric 138 actuates the bell crank 141 through the medium of the rod 140 to shift the rod 145, thereby rotating the annulus 112 in the reversing frame to urge the ends 121 of the several clutch levers into engagement with the edge of the record disk in the manner above explained, whereby said disk is held within the frame. The teeth on the gear 138 now come into mesh with the teeth on the gear 109, and rotate the frame through 180° whereby the position of the disk is reversed. It is, of course, understood that the elevating shaft 48 is returned to its normal position prior to the rotation of the reversing frame by closing a circuit through the other of the conductors 181' and the wire 207 for the reversing magnet coil 105. The operation of the vertical shaft 48 is now again reversed and the same moved upwardly to receive the disk in the frame 111, and at this time the rod 145 is again actuated by the eccentric 138 to rotate the annulus 112, and release the clutch levers 119. The vertical shaft 48 is now again reversed and lowers the disk into position upon the playing table. At this time a circuit will be closed through one of the conductors 184, the wire 233, wire 230, switch lever 215, wire 210, one of the magnets 91, wire 212, to the source of current, and thence through wire 187 back to the conductor ring thereby energizing the table gear coil whereby the table is rotated in the proper direction to start the playing of the record as hereinbefore described. The same operations of the several mechanisms as previously set forth in detail now occur in their proper sequence, and after the completion of the first described operation when the selected disk is transferred from the magazine to the table and returned to the magazine after the playing of the record, repeating, or the record reversed and then played, the conductors of the several drums will be out of engagement with the corresponding series of brushes, and the magnetic coil 236 will then be deënergized so that the lever of the switch 153 will be pulled to its open position and the motor circuit will thus be broken. Also, as before stated, during the continuance of any one of the several described operations, the proper lamp 240 will remain illuminated so that the operator can at once tell what operation has taken place, and he is thus warned against throwing the switch levers 197 and 198 for another and different operation, which would result in injury to the mechanism.

From the foregoing description, taken in connection with the accompanying drawings, it is believed that the construction and manner of operation of my improved sound reproducing machine will be clearly understood. By means of a relatively compact arrangement of the several elements in the machine, a comparatively large number of single or double disk records may be employed, and any one of said records selected from the magazine and quickly transferred to playing position upon the rotary table without liability of the slightest injury thereto. The illustrated mechanism disclosed in the drawings is, of course, merely illustrative, and, if desired, provision may be made for a greater number of the disk-carrying trays. While I have illustrated these trays as being provided with means for receiving disks of two different sizes, it is manifest that the trays can also be constructed for receiving additional disks of other sizes. I have likewise disclosed a specific construction of the clutch means in the reversing frame and actuating means therefor, but this feature also is susceptible of many mechanical changes whereby the desired end may be accomplished. The mounting and relative arrangement of the tone arm and the rotary disk table, as well as the several operating gear elements is also manifestly susceptible of obvious variations. The means for automatically controlling the movement of the sound box carrying the stylus or needle whereby the needle is properly positioned is a very important feature in the present invention, as it is, of course, essential to a practical construction that this operation shall occur in a positive manner so as to obviate all possibility of injury to the record surface. It will be understood that the limit of outward swinging movement of the tone arm 55 through the medium of the sliding carriage is such that the sound box mounted on said tone arm is disposed entirely beyond the outer edge of the record table, and consequently, beyond the edge of the largest size record disk which will be used in the machine. Thus the automatic means above referred to for positioning the stylus in the sound groove of the record will positively operate irrespective of the diameter of the record. This mechanism, as well as the several other electromechanically controlled operating mechanisms, will perform their several functions in a reliable and efficient manner. It is, nevertheless, to be borne in mind that, while I have specifically described and illustrated what I at present believe to be the preferred embodiment of my invention and the several component parts thereof, the same are susceptible of embodiment in various alternative forms, and it is consequently to be understood that I reserve the privilege of adopting all such legitimate changes as may be fairly considered to fall within the spirit and scope of the appended claims.

Having thus described my invention, what I claim is:

1. In a sound reproducing machine, a record support and actuating means therefor, a record magazine, selectively operable mechanisms to move a single record from the magazine to a predetermined position with respect to the support, and additional means subsequently operable to convey the record to playing position upon the support.

2. In a sound reproducing machine, a record support and actuating means therefor, a record magazine bearing a unitary fixed relation to the support, and automatically operated mechanism including individual record conveying members movable in angular planes with respect to each other for selectively positioning the records upon said support.

3. In a sound reproducing machine, a record support and actuating means therefor, a record magazine, selectively operable rectilinearly movable individual record carriers to position the records with respect to the support, means for selectively operating the carriers, and automatically actuated means to remove the record from the selected carrier and transfer the same to said support.

4. In a sound reproducing machine, a rotatable record table and actuating means therefor, a record magazine embodying independently operable carriers for the individual records, means for selectively actuating the carriers to dispose a record in predetermined position with respect to the table, and means to remove the record from the carrier and transfer the same to the table.

5. In a sound reproducing machine, a rotatable record table and actuating means therefor, a record magazine bearing a unitary fixed relation to the table, means for transferring the records from the magazine to the table including independently operable carriers for the individual records, and actuating means for said carriers.

6. In a sound reproducing machine, a record support and actuating means therefor, a record magazine including independently movable record carriers for the individual records, means for selectively operating said carriers to position the record thereon with respect to the support, and means for transferring the record from the carrier to said support.

7. In a sound reproducing machine, a rotatable record table and actuating means therefor, a record magazine, means for transferring the records from the magazine to the table including independently operable carriers for the individual records, actuating means for said carriers, and additional automatically operable means to receive the record from the carrier and convey the same to the table.

8. In a sound reproducing machine, a record support and operating means therefor, a magazine including independently movable record carriers for the individual records arranged in superposed relation, means for selectively operating said carriers to position the record thereon with respect to the support, and an automatically operable rectilinearly movable element to remove the record from the carrier and transfer the same to the support.

9. In a sound reproducing machine, a horizontally disposed rotary record table and actuating means therefor, a record magazine including independently movable record supports, means for selectively moving the supports to dispose a disk in predetermined relation to the table, automatically operable means to remove the disk from the support, and automatic means to reverse the movement of the support, said record removing means subsequently operating to position the record upon the table.

10. In a sound reproducing machine, a rotary record table and actuating means therefor, a record magazine including means for movably supporting a plurality of disk records in spaced horizontal planes, means for selectively moving the records to a position above the record table, and means for lowering the record disk upon the table including a member axially movable through the table.

11. In a sound reproducing machine, a rotary record table and actuating means therefor, a record magazine including a plurality of individually movable carriers arranged in superposed relation, means for selectively moving the carriers to position the record with respect to the table, means rectilinearly movable in a plane at an angle with respect to the plane of movement of the disk carrier to remove the disk from the carrier, automatic means to reverse the movement of the carrier and return the same to its normal position, and means for subsequently actuating said disk removing means to transfer the disk to playing position upon the table.

12. In a sound reproducing machine, a rotary record table and actuating means therefor, a record magazine including a plurality of superposed individually movable record carriers, operating mechanism for said carriers, electrically controlled selecting means to move any one of the carriers and position the record thereon with relation to the support, automatic means to remove the record from the carrier, the operating means for the carriers including electrically controlled reversing gears to reverse the movement of the carrier and return the same to its normal position, and automatic electrically controlled means to subsequently reverse the operation of the record removing means and position the record upon the table.

13. In a sound reproducing machine, a rotary record table and actuating means therefor, a record magazine, selectively operable means to move an individual record from the magazine and initially position the same with respect to the table, and mechanical disk transferring means including a disk transferring member movable in a plane at an angle with respect to the plane of the initial movement of the disk to receive and transfer the disk to its playing position upon the table.

14. In a sound reproducing machine, a rotary record table and actuating means therefor, a record magazine, selectively operable means to initially position a selected record with respect to the table, and automatically operable mechanism including a disk transferring member movable in a plane at right angles to the plane of the initial movement of the record to receive and transfer the record to its playing position upon the table.

15. In a sound reproducing machine, a rotary record table, motor-operated gearing for actuating said table, means for supporting a disk record above and in spaced relation to the table, transferring means axially movable through the table to remove the record from said support and transfer the same to playing position upon the table, and gearing for actuating said transferring means including automatically-operable electrically-controlled reversing gears.

16. In a sound reproducing machine, a horizontally disposed record disk table and means for rotating said table, a normally stationary plate disposed below the upper surface of the table, and means for automatically elevating said plate upon the completion of the playing operation to move the record disk to a position above and in spaced relation to the table.

17. In a sound reproducing machine, a horizontally disposed record disk table and means for rotating said table, disk displacing means normally disposed in the plane of rotation of the table, and means for automatically actuating said disk displacing means upon the completion of the playing operation to displace the disk from its operative position upon the table.

18. In a sound reproducing machine, a rotary record table, an actuating means therefor, a tone arm mounted for swinging movement above the table and equipped with a sound box swiveled thereon and having a reproducing stylus, electro-mechanical means for rotating the sound box to dispose the stylus in inoperative position, and additional electro-mechanical means to initially move the tone arm inwardly over the record disk, and then break the circuit of the first-named electro-mechanical means to release the sound box whereby the stylus is permitted to engage in the record groove.

19. In a sound reproducing machine, a rotary record table, an actuating means therefor, a tone arm mounted for swinging movement above the table and equipped with a sound box swiveled thereon and having a reproducing stylus, electro-mechanical means for rotating the sound box to dispose the stylus in inoperative position, additional electro-mechanical means to initially move the tone arm inwardly over the record disk, stop means contacting with the edge of the record disk to limit such initial movement of the tone arm, said second-named electro-mechanical means including a part operating to break the circuit of the first-named electro-mechanical means and release the sound box to thereby permit the stylus to engage in the record groove.

20. In a sound reproducing machine, a rotary record table and actuating means therefor, a tone arm mounted for swinging movement above the table and having a sound box swiveled thereon provided with a reproducing stylus, means operatively connected to the sound box to sustain the stylus in inoperative position, automatic means for initially swinging the tone arm inwardly to dispose the stylus in starting position above the record groove and including means operable to permit the sound box to rotate whereby the stylus may engage in the record groove and to also break the operative connection of said means with the tone arm to permit of the continued inward movement of the tone arm over the record independently of such initial positioning means.

21. In a sound reproducing machine, a rotary record table and actuating means therefor, a tone arm mounted for swinging movement above the table and equipped with a reproducing stylus, movable means operatively connected to the tone arm, electro-mechanical means for rendering said movable means operative to initially swing the tone arm inwardly and dispose the same in starting position, and means for positively limiting such initial swinging movement of the tone arm whereby in the continued operation of the electro-mechanical means, the operative connection between the same and said first-named means is destroyed to permit of the continued inward movement of the tone arm by the co-action of the record with the stylus.

22. In a sound reproducing machine, a rotary record table and actuating means therefor, a tone arm mounted for swinging movement above the table and equipped with a reproducing stylus, movable means operatively connected to the tone arm, electro-mechanical means for rendering said movable means operative to initially swing the tone arm inwardly and dispose the same in starting position, means for positively limiting such initial swinging movement of the tone arm whereby in the continued operation of the electro-mechanical means, the operative connection between the same and said first-named means is destroyed to permit of the continued inward movement of the tone arm by the co-action of the record with the stylus, and means for automatically reversing the operation of said electro-mechanical means when the playing of the record has been completed to cause the same to reverse the operation of said first-named means and swing the tone arm outwardly to position the stylus beyond the edge of the record disk.

23. In a sound reproducing machine, a rotary record table and actuating means therefor, a tone arm mounted for swinging movement above the table and equipped with a reproducing stylus, a carriage operatively connected to the tone arm, a traveling nut and a reversible operating screw therefor, electrically-controlled means for operatively connecting the nut to the carriage and initially swinging the tone arm inwardly to dispose the stylus in starting position in the travel of the nut in one direction, means for positively limiting such initial swinging movement of the tone arm whereby, in the continued travel of the nut, the circuit of said electrically-controlled connecting means is broken to permit the subsequent continued inward movement of the tone arm by the co-action of the record disk with the stylus.

24. In a sound reproducing machine, a rotary record table and actuating means therefor, a tone arm mounted for swinging movement above the table and equipped with a reproducing stylus, a carriage operatively connected to the tone arm, a traveling nut and a reversible operating screw therefor, electrically-controlled means for operatively connecting the nut to the carriage and initially swinging the tone arm inwardly to dispose the stylus in starting position in the travel of the nut in one direction, means for positively limiting such initial swinging movement of the tone arm whereby, in the continued travel of the nut, the circuit of said electrically-controlled connecting means is broken to permit the subsequent continued inward movement of the tone arm by the coaction of the record disk with the stylus, and electrically-controlled reversing gearing, automatically operated when the playing of the record is completed, to reverse the travel of the nut whereby the same is caused to reverse the movement of the carriage and return the tone arm to starting position.

25. In a sound reproducing machine, a rotary record table, and actuating means therefor, a tone arm mounted for swinging movement above the table and equipped with a swiveled sound box having a reproducing stylus, means operatively connected to the tone arm to swing the same outwardly to starting position, said means including a rectilinearly movable element, automatically controlled reversible operating means for said element, electrically-controlled means mounted on the tone arm and operatively connected to the sound box, a circuit therefor, a switch in the circuit carried by said rectilinearly movable element, means for operating said switch at the end of the travel of said element in one direction to close the circuit for said electrically-controlled means and rotate the sound box, whereby the stylus is disposed out of contact with the record surface in the outward swinging movement of the tone arm, and means for limiting inward swinging movement of the tone arm in the initial travel of said element in one direction, whereby the operative connection between said element in its continued travel and the tone arm is destroyed and the circuit through said switch automatically broken to release the sound box and permit the stylus to engage in the record groove.

26. In a sound reproducing machine, a rotary record table and actuating means therefor, a tone arm mounted for swinging movement above the table and equipped with a swiveled sound box having a reproducing stylus, means carried by the tone arm and operatively connected to the sound box to differentially position the stylus with respect to the record, means operatively connected to the tone arm to automatically swing the tone arm outwardly over the record upon the completion of the playing operation and to also initially swing the tone arm inwardly to starting position, and means associated with said last-named means for automatically controlling the operation of the means on the tone arm and rotate the sound box to sustain the stylus out of contact with the record in the outward movement of the tone arm and to position the stylus in the record groove at the end of the initial inward movement of the tone arm.

27. In a sound reproducing machine, a rotary record table, and automatically reversible actuating means therefor, a tone arm mounted for swinging movement above the table and equipped with reproducing means including a stylus movable in a vertical plane with respect to the tone arm, means for initially swinging the tone arm inwardly to dispose the reproducing means in starting position and to also swing the tone arm outwardly upon the completion of the playing of the record, means for positioning the reproducing stylus, and means for synchronously actuating the tone arm swinging means and the stylus positioning means.

28. In a sound reproducing machine, a rotary record table and reversible actuating means therefor, a tone arm mounted for swinging movement above the table and equipped with reproducing means including a stylus movable in a vertical plane with respect to the record, automatic means for initially swinging the tone arm to dispose the reproducing stylus in starting position and to also swing the tone arm outwardly upon the completion of the playing of the record, and additional automatically-operable means for positioning the stylus with respect to the record in the swinging movements of the tone arm.

29. In a sound reproducing machine, a rotary record table and reversible actuating means therefor, a tone arm mounted for swinging movement above the record table and equipped with relatively movable reproducing means including a stylus, means for moving said reproducing means to position the stylus with respect to the record in the swinging movements of the tone arm in opposite directions, means operatively connected to the tone arm to swing the same, means electrically controlling the operation of the table actuating means including a circuit, and automatically operable means in the circuit for synchronously actuating the tone arm swinging means and the stylus positioning means in the rotation of the table in reverse directions.

30. In a sound reproducing machine, a rotary record table and reversible actuating means therefor, a tone arm mounted for swinging movement above the record table and equipped with relatively movable reproducing means including a stylus, means for moving said reproducing means to position the stylus with respect to the record in the swinging movements of the tone arm in opposite directions, means operatively connected to the tone arm to swing the same, means electrically controlling the operation of the table actuating means including a circuit, said tone arm swinging means including electrical means in said circuit to effect the initial swinging movement of the tone arm to its starting position, electrical means in series with the electrical means of the tone arm swinging means to synchronously actuate the means for positioning the reproducing stylus, and an automatically operable switch to make and break the circuit for each of said electrical controlling means.

31. In a sound reproducing machine, a rotary record table and reversible actuating means therefor, a tone arm mounted for swinging movement above said table and equipped with relatively movable sound reproducing means including a stylus, a sliding carriage operatively connected to the tone arm, a traveling nut and operating screw therefor, means mounted upon the tone arm and connected to the reproducing means to variably position the stylus with respect to the record, electrical means controlling the operation of the table actuating means and a circuit therefor, electro-magnets in said circuit to connect the tone arm carriage to the nut for travel with the latter in one direction to initially swing the tone arm inwardly to its starting position, means on the movable reproducer, for positively limiting such initial swinging movement of the tone arm, whereby the circuit of said magnets is broken in the continued travel of the nut, and electrical means in series with said magnets to control the operation of the stylus positioning means.

32. In a sound reproducing machine, a rotary record table and reversible actuating means therefor, a tone arm mounted for swinging movement above said table and equipped with relatively movable sound reproducing means including a stylus, a sliding carriage operatively connected to the tone arm, a traveling nut and operating screw therefor, means mounted upon the tone arm and connected to the reproducing means to variably position the stylus with respect to the record, electrical means controlling the operation of the table actuating means and a circuit therefor, electro-magnets in said circuit to connect the tone arm carriage to the nut for travel with the latter in one direction to initially swing the tone arm inwardly to its starting position, means on the movable reproducer for positively limiting such initial swinging movement of the tone arm, whereby the circuit of said magnets is broken in the continued travel of the nut, independently energizable magnets in series with said first-named magnets and controlling the operation of the stylus positioning means, the latter magnets being deënergized when the circuit is broken through the first-named magnets, whereby the stylus is positioned in the record groove, and a switch in the circuit automatically operable at the end of the traveling movement of the nut in one direction to energize one of the last-named magnets and move the stylus out of engagement with the record and retain the stylus in such position during the reverse travel of the nut, contacts on the carriage and nut to close the circuit through the first-named magnets, and means for further operating said switch at the end of the latter travel of the nut and when the reproducing mechanism is positioned beyond the edge of the record disk to energize the other of the second-named magnets and operate the reproducer moving means to position the stop element for contact with the edge of the record disk.

33. In a sound reproducing machine, a horizontally disposed rotatable record table and actuating means therefor, a tone arm mounted for swinging movement above the table and equipped with sound reproducing means, means for automatically swinging the tone arm outwardly beyond the edge of the record disk upon the completion of the playing operation, and automatically operable means axially movable through the table to remove the record disk therefrom.

34. In a sound reproducing machine, a rotary record table and actuating means therefor, a tone arm mounted for swinging movement above the table and equipped with sound reproducing means, means for automatically swinging the tone arm outwardly beyond the edge of the record table upon the completion of the playing of the record, and disk-receiving and sustaining means axially movable through the record table to receive a disk and lower the same into playing position on the table when the tone arm is in the latter position.

35. In a sound reproducing machine, a rotary record table and actuating means therefor, the upper face of the table being centrally provided with a recess, means normally positioned within said recess and movable with respect to the table to receive and transfer a record disk to its playing position upon the table, a tone arm mounted for swinging movement above the table and equipped with sound reproducing means, means for automatically swinging the tone arm beyond the edge of the table upon the completion of the playing operation, and automatically operable means to position said disk transferring means with respect to the table in the latter position of the tone arm to receive a record disk and then return the disk transferring means to its normal position whereby the record is placed in playing position on the table.

36. In a sound reproducing machine, a rotary record table and actuating means therefor, said table being provided with a recess in its upper face, and axially movable disk transferring elements normally positioned in said recess, a tone arm mounted for swinging movement above the table and equipped with sound reproducing means, means for automatically swinging the tone arm outwardly beyond the edge of the table upon the completion of the playing operation, and automatically operable means to elevate said disk transferring element above the table in position to receive a record disk and then lower said element into the recess of the table whereby the record disk is placed in playing position on the table.

37. In a sound reproducing machine, a rotary record table and actuating means therefor, means axially movable through the table to remove a disk from its playing position or to position a disk on the table, reversible actuating means for said axially movable means, means for automatically operating the axially movable means upon the completion of the playing of the record to elevate the record above the table, and automatic means for reversing the disk, said axially movable means being subsequently operable to return the reversed disk to its playing position on the table.

38. In a sound reproducing machine, a rotary record table and actuating means therefor, rotatable disk holding means mounted above the table, means axially movable with respect to the table to elevate a record disk therefrom, means for actuating the holding means to operatively engage the same with the disk, reversible actuating means for said axially movable means, means for rotating the disk holding means to reverse the position of the disk, said axially movable means being operated to receive the disk upon its release by the holding means and to return the disk to its playing position upon the table.

39. In a sound reproducing machine, a rotary record table and actuating means therefor, a rotatable frame mounted above the table, disk holding dogs mounted in said frame, movable means coacting with dogs, automatic means for elevating a record from the table and for returning the record to the table after it has been reversed, means for automatically operating the dog actuating means to engage and disengage the dogs from the record disk, and means for rotating said frame to reverse the record disk.

40. In a sound reproducing machine, a rotary record table and actuating means therefor, a frame rotatably mounted above said table, spaced movable disk engaging dogs mounted in said frame, relatively movable means mounted in the frame to coact with the dogs, automatic means for elevating a record disk from the table and returning the disk to the table, means for rotating said frame, and means operatively associated with the frame rotating means to operate the dog-actuating means to operatively engage the dogs with the disk prior to the rotation of the frame and release the dogs from engagement with the disk after the frame has been rotated and the position of the disk reversed.

41. In a sound reproducing machine, a rotary record table and actuating means therefor, a disk reversing frame rotatably mounted above the table, spaced disk engaging dogs mounted in said frame, a circumferentially movable annulus in the frame, means on said annulus to coact with the respective dogs and move the dogs to operative or inoperative positions, means automatically operable to elevate a disk from the record table and return the disk to the table after the reversal of the disk, means for shifting said annulus to engage the dogs with the disk positioned in the frame, means for rotating the frame to reverse the disk, the actuating means for said annulus being subsequently operated to release the disk, said disk elevating means returning the disk to its playing position on the table.

42. In a sound reproducing machine, a rotary record table and actuating means therefor, a disk magazine including a plurality of superposed selectively operable disk carriers, automatically operable means for transferring a disk from any one of the carriers to the record table and for replacing the disk upon the carrier, and electrical means for automatically controlling the operation of the record table, the disk carriers, and the disk transferring means.

43. In a sound reproducing machine, a rotary record table and actuating means therefor, a disk magazine including a plurality of superposed selectively operable diskcarriers, automatically operable reversing means, and electrical means for controlling the operation of the record table, the disk carriers, and the disk reversing means.

44. In a sound reproducing machine, a rotary record table and actuating means therefor, a tone arm mounted for swinging movement above the table and equipped with sound reproducing means, means for positioning the tone arm with respect to the record disk, a disk magazine, means for selectively transferring the disk from the magazine to the record table, and electrical means for controlling the operation of the rotary table, the tone arm, the disk transferring means, and the disk reversing means.

45. In a sound reproducing machine, a rotary record table and actuating means therefor, a disk magazine, rectilinearly movable means for transferring a disk from the magazine to the record table, said transferring means including selectively operable individual disk carriers, and electrically controlled actuating means for said carriers.

46. In a sound reproducing machine, a rotary record table and actuating means therefor, a disk magazine including a series of superposed carriers, means axially movable with respect to the record table to transfer a disk from one of the carriers to the table, and electrically controlled means for selectively operating the disk carriers.

47. In a sound reproducing machine, a rotary record table and actuating means therefor, a disk magazine including a plurality of superposed disk carriers, means for actuating said carriers, electrically controlled selective means to effect the operation of any one of the carriers and position a selected disk with respect to the record table, disk transferring means to remove the disk from the carrier and position the same upon the table, and electrically controlled actuating means for said disk transferring means.

48. In a sound reproducing machine, a rotary record table and actuating means therefor, a disk magazine, electrically controlled mechanism for moving any one of the disks from the magazine to a predetermined position with relation to the record table, means to receive the disk and transfer the same to the record table, electrically controlled actuating mechanism for said transferring means, and disk reversing means including a part of said disk transferring means, and an automatically operable rotatably mounted disk-receiving frame.

49. In a sound reproducing machine, a rotary record table and actuating means therefor, a record disk magazine, automatic mechanism for selectively transferring a disk from the magazine to the record table, automatic disk reversing mechanism, and electrical operating means for the table and said mechanism including a circuit and a switch in said circuit operable to close the circuit for the transferring mechanism and to repeat the playing of the record, or to operate the disk reversing mechanism and render the disk transferring means inoperative.

50. In a sound reproducing machine, a rotary record table and actuating means therefor, a record disk magazine, mechanism for selectively transferring a disk from the magazine to the record table, automatically operable record reversing mechanism including a part of the disk transferring means, and electrical means controlling the operation of said table and said mechanism including a circuit, and a switch arranged therein, said switch in one position closing the circuit for the operation of the disk transferring means and the table rotating mechanism and said switch in another position closing the circuit for the operation of the table and the record reversing mechanism.

51. In a sound reproducing machine, a rotary record table and actuating means therefor, a record disk magazine, mechanism for selectively transferring a disk from the magazine to the record table, automatically operable record reversing mechanism including a part of the disk transferring means, and electrical means controlling the operation of said table and said mechanism including a circuit, and a switch arranged therein, said switch in one position closing the circuit for the operation of the disk transferring means and the table rotating mechanism and said switch in another position closing the circuit for the operation of the table and the record reversing mechanism, and said switch in a third position closing the circuit for the operation of the table rotating mechanism independently of both the transferring mechanism and the record reversing mechanism.

52. In a sound reproducing machine, a rotary record table and actuating means therefor, a disk magazine, mechanism for selectively transferring a record disk from the magazine to the table, automatic record reversing mechanism and electrical means controlling the operation of the table and said mechanisms including a circuit, means for automatically controlling the circuit for the operation of the disk transferring means after the transference of a record to the table, and a master switch in the circuit operable to close the circuit for the operation of the table and the disk transferring means, or to close the circuit for the operation of the table and the disk reversing means.

53. In a sound reproducing machine, a rotary record table and actuating means therefor, a disk magazine, mechanism for selectively transferring a disk from the magazine to the table, automatic record reversing mechanism including a part of the disk transferring means, electrical means controlling the operation of the table and said transferring and reversing mechanisms including a circuit, a master switch to close the circuit for the operation of the table and the disk transferring mechanism, or, secondly, to close the circuit for the operation of the table and the record reversing mechanism, or, thirdly, to close the circuit for the operation of the table independently of both the transferring and reversing mechanisms, and means in the circuit to automatically break the circuit of the disk transferring mechanism independently of said switch after the record has been transferred to the table.

54. In a sound reproducing machine, a rotary record table and actuating means therefor, a record magazine, mechanism for selectively transferring a record disk from the magazine to the table, mechanism for automatically reversing the record, electrical means for controlling the operation of the table and the transferring and reversing mechanisms including a circuit, a switch in the circuit operable to close said circuit for the actuation of the table and the disk transferring means, or for the operation of the table and the reversing mechanism, or, for the operation of the table independently of said mechanisms to repeat the playing of the record.

55. In a sound reproducing machine, a rotary record table and actuating means therefor, a record magazine, mechanism for selectively transferring a record disk from the magazine to the table, mechanism for automatically reversing the record, electrical means for controlling the operation of the table and the transferring and reversing mechanisms including a circuit, a switch in the circuit operable to close said circuit for the actuation of the table and the disk transferring means, or for the operation of the table and the reversing mechanism, or for the operation of the table independently of said mechanisms to repeat the playing of the record, and indicative means in the circuit to indicate the condition thereof.

56. In a sound reproducing machine, a rotary record table and reversible actuating means therefor, a tone arm mounted for swinging movement above the table and equipped with sound reproducing means, and means geared to the table rotating means and operatively connected to the tone arm to automatically swing the tone arm outwardly beyond the edge of the record table when the rotation of the table is reversed.

57. In a sound reproducing machine, a rotary record table and reversible actuating means therefor, a tone mounted for swinging movement above the table and equipped with sound reproducing means, and means geared to the table rotating means and operatively connected to the tone arm to automatically swing the tone arm outwardly beyond the edge of the record table when the rotation of the table is reversed, and electrical means to render said last-named means operative to swing the tone arm inwardly and position the reproducing mechanism with respect to the record and to render said means inoperative in the subsequent rotation of the table during the playing of the record.

58. In a sound reproducing machine, a rotary record table and reversible actuating means therefor, a tone arm mounted for swinging movement above the table and equipped with sound reproducing means, and rectilinearly movable means geared to the table rotating means and operatively connected to the tone arm to swing the tone arm outwardly beyond the edge of the record disk when the rotation of the record table is reversed.

59. In a sound reproducing machine, a rotary record table, and reversible actuating means therefor, a tone arm mounted for swinging movement above the table and equipped with sound reproducing means, a sliding carriage operatively connected to the tone arm, and means operated by the table rotating means to move the carriage in one direction and swing the tone arm outwardly beyond the edge of the record disk when the rotation of the table is reversed.

60. In a sound reproducing machine, a rotary record table and reversible actuating means therefor, a tone arm mounted for swinging movement above the table and equipped with sound reproducing means, a sliding carriage operatively connected to the tone arm, means operated by the table rotating means to move the carriage in one direction and swing the tone arm outwardly beyond the edge of the record disk when the rotation of the table is reversed, and means for electrically connecting the carriage to said last named means to initially swing the tone arm inwardly and position the sound reproducing means with respect to the record.

61. In a sound reproducing machine, a rotary record table and reversible actuating means therefor, a tone arm mounted for swinging movement above the table and equipped with sound reproducing means, a slidable carriage operatively connected to the tone arm, and a traveling nut geared to the table actuating means to move the carriage in one direction and swing the tone arm outwardly beyond the edge of the record disk when the rotation of the table is reversed.

62. In a sound reproducing machine, a rotary record table and reversible actuating means therefor, a tone arm mounted for swinging movement above the table and equipped with sound reproducing means, a slidable carriage operatively connected to the tone arm, a traveling nut geared to the table actuating means to move the carriage in one direction and swing the tone arm outwardly beyond the edge of the record disk when the rotation of the table is reversed, and electro-magnets interposed between the carriage and said nut and operable to connect the carriage to the nut for movement in the reverse travel of the latter whereby the tone arm is swung inwardly to dispose the sound reproducing means in starting position with respect to the record.

63. In a sound reproducing machine, a rotary record table and reversible actuating means therefor, a tone arm mounted for swinging movement above the table and equipped with sound reproducing means, a slidable carriage operatively connected to the tone arm, a traveling nut geared to the table actuating means to move the carriage in one direction and swing the tone arm outwardly beyond the edge of the record disk when the rotation of the table is reversed, electro-magnets interposed between the carriage and said nut and operable to connect the carriage to the nut for movement in the reverse travel of the latter whereby the tone arm is swung inwardly to dispose the sound reproducing means in starting position with respect to the record, and means for limiting such inward movement of the tone arm whereby the magnets are deënergized in the continued travel of the nut and the sliding movement of the carriage in the same direction continued independently of said nut.

64. In a sound reproducing machine, a rotary record table and reversible actuating means therefor, a tone arm mounted for swinging movement above the table and equipped with relatively movable sound reproducing means including a stylus, means on the tone arm automatically actuated at the end of its inward swinging movement to move the sound reproducing means and lift the stylus from the record, and means geared to the table rotating mechanism and operatively connected to the tone arm to swing the latter outwardly beyond the edge of the record disk.

65. In a sound reproducing machine, a rotary record table and reversible actuating means therefor, a tone arm mounted for swinging movement above the table and equipped with relatively movable sound reproducing means including a stylus, electrically controlled means mounted upon the tone arm to move the sound reproducing means at the end of the inward swinging movement of said arm and disengage the stylus from the record, and automatically operable means geared to the table rotating means to swing the tone arm outwardly and position the sound reproducing means beyond the edge of the record disk.

66. In a sound reproducing machine, a rotary record table and reversible actuating means therefor, a tone arm mounted for swinging movement above the table and equipped with relatively movable sound reproducing means including a stylus, electrically controlled means mounted upon the tone arm to move the sound reproducing means at the end of the inward swinging movement of said arm and disengage the stylus from the record, and automatically operable means geared to the table rotating means to swing the tone arm outwardly and position the sound reproducing means beyond the edge of the record disk, said means including electrically controlled means to swing the tone arm inwardly in the rotation of the table in one direction and dispose the sound reproducing means in starting position.

67. In a sound reproducing machine, a rotary record table and reversible actuating means therefor, a tone arm mounted for swinging movement above the table and equipped with relatively movable sound reproducing means including a stylus, electrically controlled means mounted upon the tone arm to move the sound reproducing means at the end of the inward swinging movement of said arm and disengage the stylus from the record, and automatically operable means geared to the table rotating means to swing the tone arm outwardly and position the sound reproducing means beyond the edge of the record disk, said means including a part operatively connected with the tone arm, a part movable with respect to the first part in the rotation of the table in one direction, and means to connect said parts for movement as a unit to initially swing the tone arm inwardly and dispose the reproducing means in starting position with respect to the record but permitting of the subsequent independent movement of the second-named part.

68. In a sound reproducing machine, a rotary record table and reversible actuating means therefor, a tone arm mounted for swinging movement above the table and equipped with relatively movable sound reproducing means including a stylus, electrically controlled means mounted upon the tone arm to move the sound reproducing means at the end of the inward swinging movement of said arm and disengage the stylus from the record, and automatically operable means geared to the table rotating means to swing the tone arm outwardly and position the sound reproducing means beyond the edge of the record disk, said means including a part operatively connected with the tone arm, a part movable with respect to the first part in the rotation of the table in one direction, and electrically controlled means to connect said parts for movement as a unit to initially swing the tone arm inwardly and dispose the reproducing means in starting position with respect to the record but permitting of the subsequent independent movement of the second-named part.

69. In a sound reproducing machine, a rotary record table and reversible actuating means therefor, a tone arm mounted for swinging movement above the table and equipped with relatively movable sound reproducing means including a stylus, electrically controlled means for moving the sound reproducing means at the end of the inward swinging movement of the tone arm to disengage the stylus from the record, a sliding carriage operatively connected to the tone arm, a traveling nut, actuating means for the nut, electro-magnets to bind the nut to the carriage in the movement of the nut in one direction whereby the tone arm is swung outwardly beyond the edge of the record disk, the reverse travel of the nut operating to initially swing the tone arm inwardly and dispose the reproducing means in its starting position, and means for limiting such initial inward movement of the tone arm whereby the electro-magnets are deënergized in the continued travel of the nut to permit of the independent sliding movement of the carriage during the playing of the record.

70. In a sound reproducing machine, a rotary record table and reversible actuating means therefor, a tone arm mounted for swinging movement above the table and equipped with relatively movable sound reproducing means including a stylus, automatically operable means to move the reproducing means at the end of the inward swinging movement of the tone arm to disengage the stylus from the record, and rectilinearly movable means geared to the table rotating means and operatively connected to the tone arm and including relatively movable parts operable as a unit to swing the tone arm outwardly at the end of the playing operation and also initially swing the tone arm inwardly to dispose the reproducing means in starting position but permitting of the continued inward independent swinging movement of the tone arm.

71. In a sound reproducing machine, a record disk table, and means for rotating said table, and optionally operable mechanism to reverse the position of the record disk upon the table.

72. In a sound reproducing machine for playing records of the double disk type, a rotatable record table and actuating means therefor, and optionally operable means for positioning the record disk whereby the score on either face of the disk may be reproduced, said means including a disk clutch disposed in spaced concentric relation to the table, means for positioning a disk for engagement by the clutch, and means for rotating the clutch and the disk held thereby.

73. In a sound reproducing machine for playing records of the "double-disk" type, a horizontally disposed rotatable record table and actuating means therefor, optionally operable means to displace the record from the table upon the completion of the playing operation, and subsequently return the disk to the table, and means automatically operable when the record is so displaced to reverse the record disk.

74. In a sound reproducing machine, a rotary record table and actuating means therefor, a tone arm mounted for swinging movement above the table, means operatively connected to the tone arm and automatically actuated to initially move the tone arm inwardly over the record disk, and stop means carried by the tone arm to engage the edge of the record disk and limit such initial movement of the tone arm whereby the reproducing stylus is disposed in its starting position in the record groove.

75. In a sound reproducing machine, a rotary record table and actuating means therefor, a tone arm mounted for swinging movement above the table, equipped with a sound box swiveled thereon and having a reproducing stylus, means carried by the tone arm and operatively connected to the sound box to sustain the stylus out of contact with the record surface, additional means to initially move the tone arm inwardly over the record disk and then release the tone arm for continued independent swinging movement, said latter means being coöperatively associated with the stylus sustaining means on the tone arm whereby said latter means is rendered inoperative at the end of the initial inward movement of the tone arm and the sound box released to permit the stylus to engage in the record groove.

76. In a sound reproducing machine, a horizontally disposed record table and actuating means therefor, a tone arm mounted for swinging movement above the table and equipped with a sound box swiveled thereon and having a reproducing stylus, electromechanical means mounted upon the tone arm and operatively connected to the sound box to sustain the stylus in an inoperative position, automatically operable means to initially swing the tone arm inwardly, and means to positively limit such initial movement of the tone arm, said tone arm swinging means including a part operable to break the circuit of said electro-mechanical means and release the sound box whereby the stylus is permitted to engage in the record groove.

77. In a sound reproducing machine, a rotary record table and actuating means therefor, a tone arm mounted for swinging movement above the table and equipped with a sound box having a reproducing stylus, means operatively connected to the tone arm to swing the same outwardly to starting position, said means including a rectilinearly movable element, automatically operable means for reversibly moving said element, a circuit therefor, a switch in the circuit carried by said rectilinearly movable means for operating said switch at the end of travel of said element in one direction to reverse the movement of said element and swing the tone arm inwardly toward the record disk, and means for positively limiting such inward movement of the tone arm to dispose the stylus in starting position in the record groove, the movement of said rectilinearly movable element continuing independently of the tone arm, and means for operating the switch at the end of such independent movement of the element to reverse the operation of the actuating means therefor and render said element operative to swing the tone arm outwardly beyond the edge of the record table.

78. In a sound reproducing machine, a rotary record table and actuating means therefor, a disk magazine including a series of superposed disk carriers, disk transferring means axially movable through the table to receive a disk from a selected carrier and transfer the same to the table, and means for selectively operating the disk carriers.

79. In a sound reproducing machine, a rotary record table and actuating means therefor, a disk magazine including a plurality of superposed disk carriers, electrically controlled selective mechanism to move any one of said carriers and position a selected disk with respect to the record table, and subsequently operable electrically controlled means to transfer the disk from the carrier to its playing position on the table.

80. In a sound reproducing machine, a rotary record table, and actuating means therefor, a disk magazine, selective mechanism to move any one of the disks from the magazine to a predetermined position with relation to the record table, means to receive the disk and transfer the same from such position to the record table, actuating mechanism for said transferring means, and disk reversing means including a part of said disk transferring means.

81. In a sound reproducing machine, a rotary record table, and actuating means therefor, a disk magazine, selective mechanism to move any one of the disks from the magazine to a predetermined position with relation to the record table, means to receive the disk and transfer the same from such position to the record table, actuating mechanism for said transferring means, and disk reversing mechanism including a rotatable disk support.

82. In a sound reproducing machine, a rotary record table and actuating means therefor, a disk magazine, mechanism for moving any one of the disks from the magazine to a predetermined position with relation to the record table, electrically controlled means to receive the disk and transfer the same to the record table, and controllable disk reversing means including a rotatably mounted disk receiving frame.

83. In a sound reproducing machine, a rotary record table and actuating means therefor, means for reversing the position of the disk upon the table, and electrical operating means for the table and the disk reversing means including a circuit, and a switch in said circuit operable to close the circuit to repeat the playing of the record, or to operate said disk reversing means.

84. In a sound reproducing machine, a rotary record table and actuating means therefor, a record disk magazine, mechanism for selectively transferring a disk from the magazine to the record table, automatically operable record reversing mechanism, and electrical means controlling the operation of said table, the transferring mechanism and the reversing mechanism including a circuit, and a switch arranged in the circuit, said switch in one position closing the circuit for the operation of the disk transferring means and the table rotating mechanism, and the said switch in another position closing a circuit for the operation of the table and the record reversing mechanism.

85. In a sound reproducing machine, a rotary record table and actuating means therefor, a record disk magazine, mechanism for selectively transferring a disk from the magazine to the record table, automatically operable record reversing mechanism, and electrical means controlling the operation of said table and said mechanisms including a circuit, and a switch arranged therein, said switch in one position closing the circuit for the operation of the table rotating mechanism, and in another position closing the circuit for the disk transferring mechanism, and in a third position closing the circuit for the operation of the record reversing mechanism.

86. In a sound reproducing machine, a rotary record table and actuating means therefor, a disk magazine, mechanism for selectively transferring a disk from the magazine to the table, electrical means controlling the operation of the table and said transferring mechanism including a circuit, a master switch to close the circuit for the operation of the table and disk transferring mechanism or to close the circuit for the operation of the table independently of said transferring mechanism, and means in the circuit to automatically break the circuit of the disk transferring mechanism independently of said switch after the record has been transferred to the table.

87. In a sound reproducing machine, the combination with a rotary record support and controllable actuating and repeating means therefor, of automatically operable means to indicate both the initial playing of a record and the repetition thereof.

88. In a sound reproducing machine for playing "double-disk" records, the combination of a rotary disk table and controllable actuating means therefor, of means automatically operable to indicate the initial playing of a record, the repetition of the record score, or the playing of the reverse side of the record.

89. In a sound reproducing machine for playing "double-disk" records, the combination of a rotary disk table and controllable actuating means therefor, of means automatically operable to indicate the initial playing of a record, the repetition of the record score, or the playing of the reverse side of the record, the appropriate indicative means remaining operative throughout the whole time of the playing operation.

90. In a sound reproducing machine, the combination with a rotary record table and controllable actuating means therefor, of electrical indicative means automatically operable to indicate the initial playing of a record score, or the repetition of the record score.

91. In a sound reproducing machine, the combination with a rotary record table and controllable actuating means therefor, of electrical indicative means automatically operable to indicate the initial playing of a record score or the repetition of the record score, the appropriate indicative means remaining operative throughout the whole time of the playing operation.

92. In a sound reproducing machine for playing reversible "double-disk" records, the combination with a rotary record table, and electrically controlled actuating means therefor, of electrical indicative means automatically operable to indicate the initial playing of a record score, the repetition of the record score, or the playing of the score on the opposite face of the disk after it has been reversed.

93. In a sound reproducing machine for playing reversible "double-disk" records, the combination with a rotary record table and electrically controlled actuating means therefor, of electrical indicative means automatically operable to indicate the initial playing of a record score, the repetition of the record score or the playing of the score on the opposite face of the disk after it has been reversed, the appropriate indicative means remaining operative throughout the time of the playing operation.

94. In a sound reproducing machine, the combination with a rotary record support and controllable actuating means therefor, of automatically operable means to indicate the initial playing of a record or the repetition of the record score, the appropriate indicative means remaining operative throughout the whole time of the playing operation.

95. In a sound reproducing machine, a rotatable record table and means for rotating said table, rotatable record reversing means having a fixed axis of rotation disposed in parallel relation to the plane of rotation of the table, and means for actuating said reversing means.

96. In a sound reproducing machine, a horizontally-disposed rotatable record table and means for rotating said table, rotatable record reversing means having a fixed axis of rotation disposed in parallel relation to the plane of rotation of the table above and in spaced relation to said table, and means for actuating said reversing means.

In testimony whereof I affix my signature.

JAMES T. BEARD, Jr.